(12) United States Patent
Park

(10) Patent No.: US 6,918,298 B2
(45) Date of Patent: Jul. 19, 2005

(54) HORIZONTAL AND TUNING FORK VIBRATORY MICROGYROSCOPE

(75) Inventor: Kyu Yeon Park, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/888,591

(22) Filed: Jul. 12, 2004

(65) Prior Publication Data

US 2005/0109107 A1    May 26, 2005

Related U.S. Application Data

(62) Division of application No. 10/610,624, filed on Jul. 2, 2003.

(30) Foreign Application Priority Data

Dec. 24, 2002  (KR) ................................ 2002-83639

(51) Int. Cl.[7] .............................................. G01D 9/04
(52) U.S. Cl. ................................................. 73/504.16
(58) Field of Search ........................ 73/504.12, 504.16, 73/504.14, 504.11, 504.04

(56) References Cited

U.S. PATENT DOCUMENTS

| 5,349,855 | A | | 9/1994 | Bernstein et al. |
| 5,747,690 | A | | 5/1998 | Park et al. |
| 6,513,380 | B2 | * | 2/2003 | Reeds et al. ............. 73/504.12 |
| 6,626,039 | B1 | * | 9/2003 | Adams et al. ........... 73/504.04 |
| 6,742,390 | B2 | * | 6/2004 | Mochida et al. ......... 73/504.14 |

* cited by examiner

Primary Examiner—John E. Chapman
(74) Attorney, Agent, or Firm—Lowe Hauptman & Berner, LLP

(57) ABSTRACT

A horizontal and tuning fork vibratory microgyroscope detects angular velocity and angular acceleration of an inertial object when the inertial object is rotated, wherein resonance directions of the microgyroscope are on the same horizontal plane in both sensing and driving modes. The microgyroscope includes a substrate, an anchored pad unit, an outer elastic element unit, an outer frame, a sensing electrode unit, an inner elastic element unit including a plurality of inner elastic elements connected to the inside of the outer frame, an inner weighted element unit including a pair of first and second inner weighted elements each having a driven comb, and a driven electrode unit including a comb drive forming a comb structure.

19 Claims, 14 Drawing Sheets

HORIZONTAL AND TUNING FORK VIBRATORY MICROGYROSCOPE

RELATED APPLICATIONS

The present application is a divisional of U.S. patent application No. 10/610,624, filed Jul. 2, 2003, the disclosure of which is hereby incorporated by reference herein in its entirety.

BACKGROUND OF THE INVENTION

1. Field of the Invention

The present invention relates to a horizontal and tuning fork vibratory microgyroscope for detecting angular velocity and angular acceleration of an inertial object when the inertial object is rotated, and more particularly to a horizontal and tuning fork vibratory microgyroscope in which resonance directions of the microgyroscope are on the same horizontal plane in both sensing and driving modes, whereby its sensing characteristics are highly improved irrespective of changes to its vertical thickness determined in a process for manufacturing the microgyroscope.

2. Description of the Related Art

As well known to those skilled in the art, a gyroscope is widely used as a sensor for detecting angular velocity and angular acceleration of an inertial object when the inertial object is rotated. As such, a gyroscope may be divided into a mechanical gyroscope and a vibratory gyroscope, according to the kind of force applied to the gyroscope. The vibratory gyroscope may be sub-divided into a ceramic gyroscope and a MEMS (micro electro-mechanical system) gyroscope, according to manufacturing process of the gyroscope. The MEMS gyroscope is manufactured using a semiconductor manufacturing process. The vibratory gyroscope may also be sub-divided into a horizontal gyroscope and a vertical gyroscope, according to the direction of the force applied to the gyroscope. The horizontal gyroscope uses a Coriolis force generated in the direction parallel to the horizontal plane of the velocity of the gyroscope. On the other hand, the vertical gyroscope uses a Coriolis force generated in the direction perpendicular to the horizontal plane of the velocity of the gyroscope.

The Coriolis force used in the vibratory gyroscope can be expressed by the following equation:

$$Fc = 2m \cdot \Omega \cdot V$$

Where, m is mass of the inertial object, $\Omega$ is angular velocity, and V is velocity. The direction of the Coriolis force Fc is determined by the axis of the velocity V and the rotational axis of the angular velocity $\Omega$. The vibratory gyroscope may be applied to an apparatus for detecting vibration generated by the inertial object to compensate for the detected vibration.

The vibratory gyroscope mainly comprises a stationary structure and a vibrating structure. The vibrating structure includes a driving unit and a sensing unit. The driving unit serves to resonate the vibrating structure by means of its self-oscillation to form a sensing condition in a driving mode, and the sensing unit serves to resonate the vibrating structure by means of the Coriolis force Fc applied in the direction perpendicular to the direction of the acceleration or the angular acceleration, which corresponds to the vibration of the inertial object. The direction of the resonance in the driving mode is perpendicular to the direction of the resonance in the sensing mode, and the size of a capacitor is measured on the basis of the magnitude of the Coriolis force Fc. It is required that the movement in the driving mode be large and the sensitivity in the sensing mode be excellent in order to improve the sensing performance of the vibratory gyroscope.

Systems for detecting the voltage of the gyroscope in the driving mode may be divided into a system for measuring the capacitance corresponding to the Coriolis force, which is converted into the voltage, and a rebalance system for measuring the voltage necessary to control the movement of the gyroscope caused by the Coriolis force.

The vibratory gyroscope as mentioned above is applied to an apparatus for preventing hand quiver in a video camera, an airbag for a vehicle, an unmanned airplane, and a head mount display (HMD).

As mentioned above, the gyroscope is a sensor for detecting the angular velocity of an inertial object in a predetermined direction. Consequently, it is required that the vibratory gyroscope be unaffected by any angular velocity or movement of the inertial object in directions different from the predetermined direction in which the angular velocity of the inertial object is to be measured. Sensitivity to movement in directions other than the fixed direction in which the angular velocity of the inertial object is to be measured is defined as cross talk or cross sensitivity. A sensor for measuring physical quantity has the sensitivity of which value is minimized. The sensitivity is generally limited to below a predetermined value depending upon specifications of the products.

A description of a conventional microgyroscope will now be given.

FIG. 1 is a plan view illustrating a conventional horizontal microgyroscope 10. As shown in FIG. 1, the conventional horizontal microgyroscope 10 comprises: a substrate; a vibratory structure 30 having first and second stripe portions 15 and 15' disposed in parallel with each other, first and second combs 20 and 21 formed at one side of the first and second stripe portions 15 and 15' respectively, and a plurality of connecting portions 16 for connecting the first and second stripe portions 15 and 15'; elastic means 11, 12 and 12' for elastically supporting the vibratory structure 30 in such a manner that the vibratory structure 30 is spaced from the substrate by a predetermined gap; driving means 13 having a third comb 19 interposed between the first comb 20 of the first stripe portion 15 for applying the vibratory structure in one direction due to an electrostatic force; sensing means 14 having a fourth comb 21 interposed between the second comb 22 of the second stripe portion 15' for sensing the movement of the vibratory structure 30 driven by the driving means 13 through a change of capacitance; and a plurality of sensing electrodes 18 disposed between the connecting portions 16 of the vibratory structure 30 on the same plane as that of the vibratory structure 30 to be spaced from the substrate at a predetermined gap for sensing displacement of the vibratory structure 30 due to a Coriolis force through a change of capacitance. The details of the aforesaid conventional horizontal microgyroscope are disclosed in U.S. Pat. No. 5,747,690.

As shown in FIG. 1, the conventional horizontal microgyroscope is driven in the horizontal direction X using the comb 21, and a Coriolis vibration of the vibratory structure 30 in the vertical direction is detected by means of the sensing electrode 18. Specifically, when the vibratory structure 30 is vibrated in the horizontal direction X by application of an alternating current to the combs 19, 20, 21 and 22 disposed at the both sides of the vibratory structure 30, the vibratory structure 30 is vibrated in the direction of Y by means of a Coriolis force when the angular velocity is applied in the direction of Z. The magnitude of the aforesaid vibration is proportional to the applied angular velocity. Consequently, angular velocity is measured by detecting the vibration of the vibratory structure 30 in the direction of Y in the form of a vibration frequency using the sensing electrode 18.

With the conventional horizontal microgyroscope, the vibratory structure is initially vibrated in the direction of X. When an outer angular velocity is applied to the vibratory structure, a Coriolis movement is generated, by which the vibratory structure is vibrated in the direction of Y to detect the angular velocity. Consequently, the vibrations transmitted in the directions of X and Y may have bad effects on the results of the detection when the angular velocity is detected as mentioned above. Especially, when the vibration is transmitted in the direction of Y, which is very sensitive, the effects are increased. The conventional horizontal microgyroscope has low detection performance especially when vibrating at a rate near a natural frequency among the external vibrations. Vibrations over frequency bands other than the natural frequency may be decreased by using an electric filter. According to the principle of the gyroscope, the angular velocity is modulated by the signal of the natural frequency (resonant frequency). Consequently, there exists a component which cannot be electrically offset in the gyroscope, by which the sensing performance of the gyroscope is decreased.

FIG. 2 is a plan view illustrating a conventional tuning fork microgyroscope. As shown in FIG. 2, the conventional tuning fork microgyroscope comprises: weighted element 64 and 66 suspended to rotate about a first axis and adapted to vibrate in a direction substantially orthogonal to the first axis; a pair of driven electrodes 36 and 38 projecting from the weighted elements 64 and 66 in the direction of vibration; a pair of driving electrodes 51 and 52 freely meshing with the pair of driven electrodes 36 and 38; a driving electronic circuit 71 of vibration drive contacting, through the weighted elements 64 and 66, the pair of driven electrodes 36 and 38, and the pair of driving electrodes 51 and 52 with opposite polarity signals to induce vibration of the weighted elements 64 and 66; a plurality of position sensors 41, 42, 43 and 44 placed at locations facing the weighted elements 64 and 66; a sensing electronic circuit 72 responsive to at least a subset of the plurality of position sensors 41, 42, 43 and 44. The details of the aforesaid conventional tuning fork microgyroscope are disclosed in U.S. Pat. No. 5,349,855.

The aforesaid conventional tuning fork microgyroscope uses a tuning fork vibrating mode, in which sensing is carried out in the direction perpendicular to the ground. The conventional tuning fork microgyroscope includes a structure having a horizontal direction of vibration in a driving mode and a vertical direction of vibration in a sensing mode. In the aforesaid structure, the largest output is obtained when the frequency in the horizontal direction is identical to the frequency in the vertical direction. Consequently, a tuning process for electrically tuning the resonant frequencies to be identical or similar is carried out after the tuning fork microgyroscope, is manufactured.

The resonant frequencies in the horizontal and vertical directions must be identical. However, the direction in the sensing mode is horizontal while the direction in the driving mode is vertical. Consequently, it is required that the height and thickness of elastic elements, such as springs, which vibrate in the horizontal and vertical directions, be identical, which makes tuning of the frequency very difficult. The frequency in the horizontal direction is sensitive to an etching process to the structure, and the resonant frequency in the vertical direction is determined on the basis of a depositing, plating, or polishing process, by which the thickness of the structure is determined. Consequently, it is required to perfectly control the aforesaid processes, which is practically difficult. Furthermore, since the sensing electrodes are disposed at one side of the microgyroscope, the measurement is carried out nonlinearly when the large angular velocity is applied to increase the magnitude of the vibration in the vertical direction.

As described above, the conventional horizontal or tuning fork microgyroscope has problems in that vibration is transmitted to the structure of the microgyroscope due to external vibration or noise, and therefore other signals interference with the measurement of the angular velocity is considerably increased. In practical applications, occurrence of such interfering signals due to vibration or noise may have bad effects upon the performance of the microgyroscope.

SUMMARY OF THE INVENTION

Therefore, the present invention has been made in view of the above problems, and it is an object of the present invention to provide a horizontal and tuning fork vibratory microgyroscope characterized in that resonance directions of the microgyroscope are on the same horizontal plane in both sensing and driving modes, whereby its sensing characteristics are highly improved irrespective of changes to its vertical thickness determined in a process for manufacturing the microgyroscope.

It is another object of the present invention to provide a horizontal and tuning fork vibratory microgyroscope which is capable of minimizing effects due to any external vibration or noise.

In accordance with one aspect of the present invention, the above and other objects can be accomplished by the provision of a horizontal and tuning fork vibratory microgyroscope comprising: a substrate having a plane structure in the horizontal direction defined by a X-axis and a Y-axis substantially perpendicular to the X-axis; an anchored pad unit including a plurality of anchored pads anchored to the substrate; an outer elastic element unit including a plurality of outer elastic elements connected at one end thereof to the anchored pads of the anchored pad unit, respectively; an outer frame made substantially in the shape of a square and connected to the other end of each of the plurality of outer elastic elements of the outer elastic element unit while the outer frame is spaced apart from the substrate by a predetermined gap, the outer frame having vibrating electrode fingers of a comb structure; a sensing electrode unit including a plurality of sensing electrodes of a comb structure, the sensing electrodes meshing with the vibrating electrode fingers of the outer frame while the sensing electrodes are spaced apart from the vibrating electrode fingers by a predetermined gap, respectively; an inner elastic element unit including a plurality of inner elastic elements connected to the inside of the outer frame; an inner weighted element unit including a pair of first and second inner weighted elements each having a driven comb, the first and second inner weighted elements being connected to the other end of the plurality of inner elastic elements of the inner elastic element unit, respectively; and a driven electrode unit including first and second driven electrodes each having a comb drive forming a comb structure, the first and second driven electrodes meshing with the first and second inner weighted elements of the inner weighted element unit while the first and second driven electrodes are spaced apart from the first and second inner weighted elements by a predetermined gap, respectively.

In accordance with another aspect of the present invention, there is provided a horizontal and tuning fork vibratory microgyroscope comprising: a substrate having a plane structure in the horizontal direction defined by a X-axis and a Y-axis substantially perpendicular to the X-axis; an anchored pad unit including a plurality of anchored pads anchored to the substrate; an outer elastic element unit including a plurality of outer elastic elements connected at one end thereof to the anchored pads of the anchored pad unit, respectively; an outer frame made substantially in the shape of a circle and connected to the other end of each of the plurality of outer elastic elements of the outer elastic element unit while the outer frame is spaced apart from the substrate by a predetermined gap, the outer frame including a driven electrode having driven electrode fingers forming a comb structure formed at the outside of the outer frame; a driven electrode unit having driven electrode fingers forming a comb structure, the driven electrode fingers meshing with the driven electrode fingers of the outer frame while the driven electrode fingers are spaced apart from the driven electrode fingers by a predetermined gap, respectively; an inner elastic element unit including a plurality of inner elastic elements connected at one end thereof to the inside of the outer frame; an inner weighted element unit including a pair of first and second inner weighted elements having vibrating electrode fingers forming comb structures, respectively, the first and second inner weighted elements being connected to the other end of the plurality of inner elastic elements of the inner elastic element unit, respectively; and a sensing electrode unit including first and second sensing electrodes having sensing electrode fingers forming comb structures, respectively, the sensing electrode fingers meshing with the vibrating electrode fingers of the first and second inner weighted elements of the inner weighted element unit while the sensing electrode fingers are spaced apart from the vibrating electrode fingers by a predetermined gap, respectively.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The present invention uses a tuning fork mode in which a pair of weighted elements are opposite to each other in such a manner that the weighted elements are alternately close to or away from each other. A strong point of the tuning fork mode is that since the weighted elements move facing each other, the microgyroscope is negligibly affected by external vibration. Furthermore, a rotational movement is generated even in a second resonance mode, which is used as a sensing mode. Consequently, the effect of external linear vibration is minimized. In order to use the tuning fork mode, two inner weighted elements must be accurately coupled with each other. Some of preferred embodiments for construction of such a microgyroscope will now be described.

An outer frame and a pair of inner weighted elements of the microgyroscope according to the present invention are elastically supported by an outer elastic element unit and an inner elastic element unit. The sizes of the weighted elements and the strengths of the elastic element units are adjusted to determine a vibrating mode and a resonant frequency of the movement of the weighted elements. Especially, the construction of the inner elastic element unit connected to the outer frame and connected between the pair of inner weighted elements is one of the important features of the present invention. The inner elastic element unit is coupled with the pair of inner weighted elements so that the inner weighted elements are resonant in the tuning fork mode. The outer and inner elastic element units, which will be described later, are constructed in such a manner that the outer elastic element unit or the inner elastic element unit has a folded structure formed in the direction in which the displacement of the vibration is large and a linear structure formed in the direction in which the displacement of the vibration is small.

Figure 1:
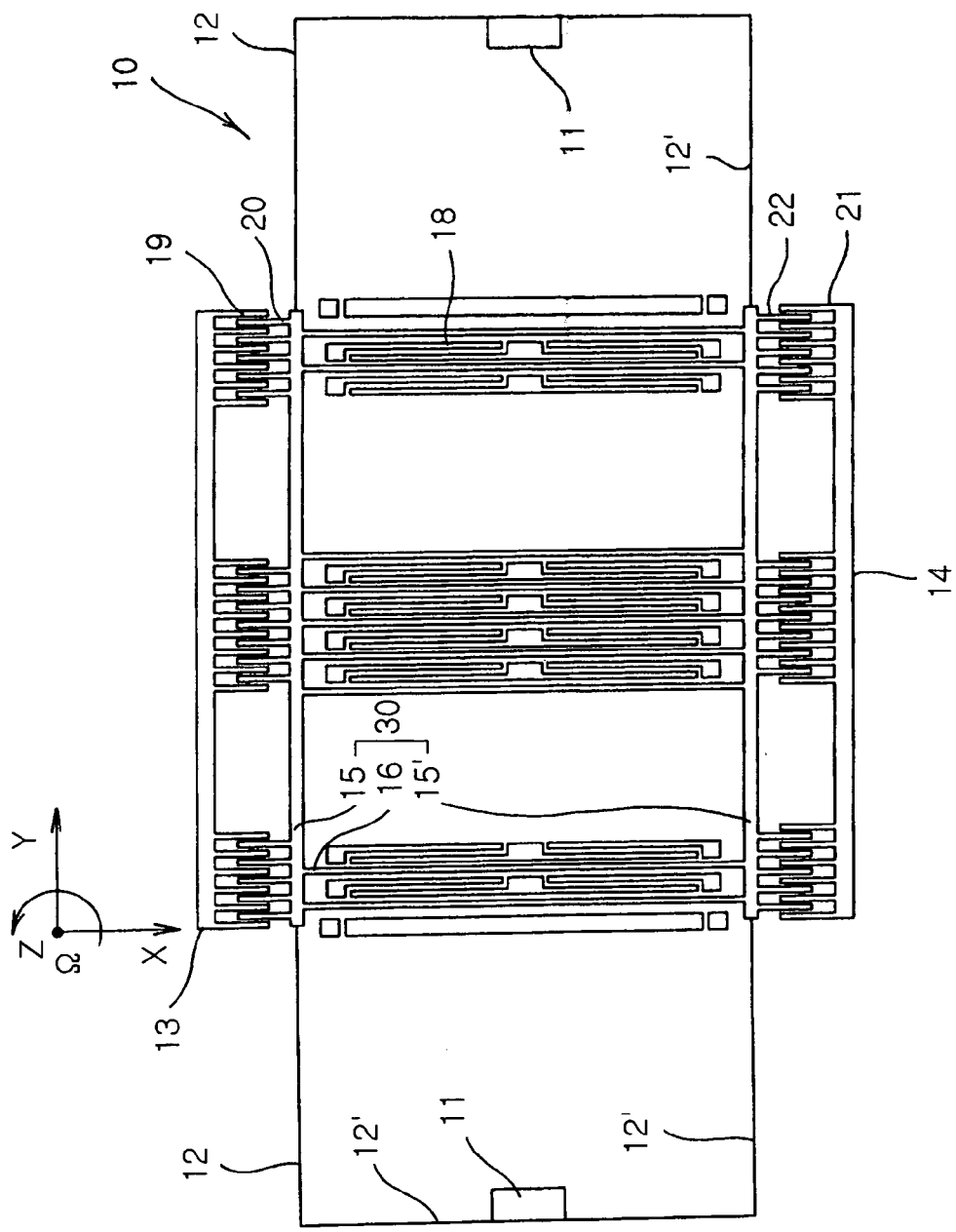
FIG. 1 is a plan view illustrating a conventional horizontal microgyroscope.
Figure 2:
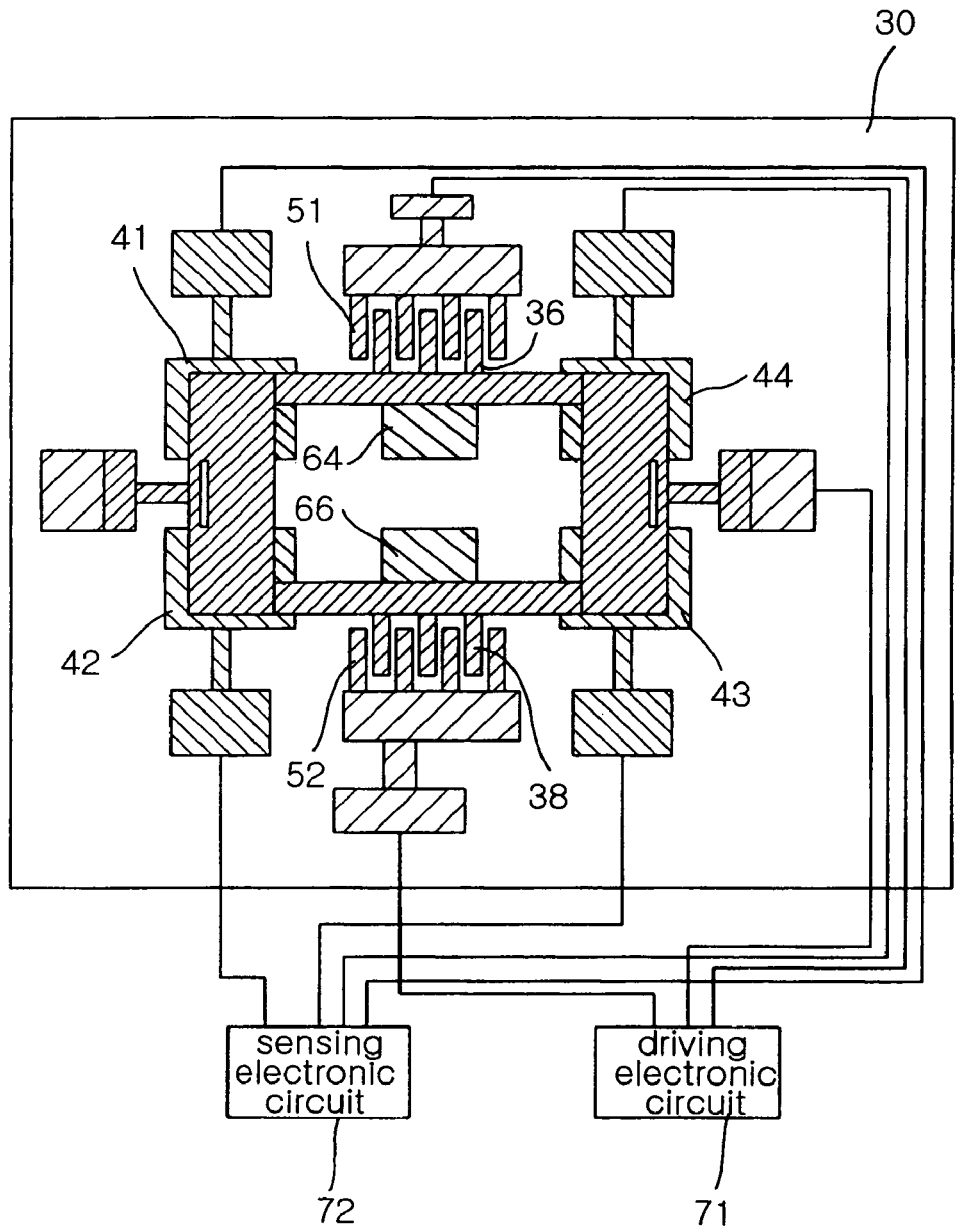
FIG. 2 is a plan view illustrating a conventional tuning fork microgyroscope.
Figure 3:
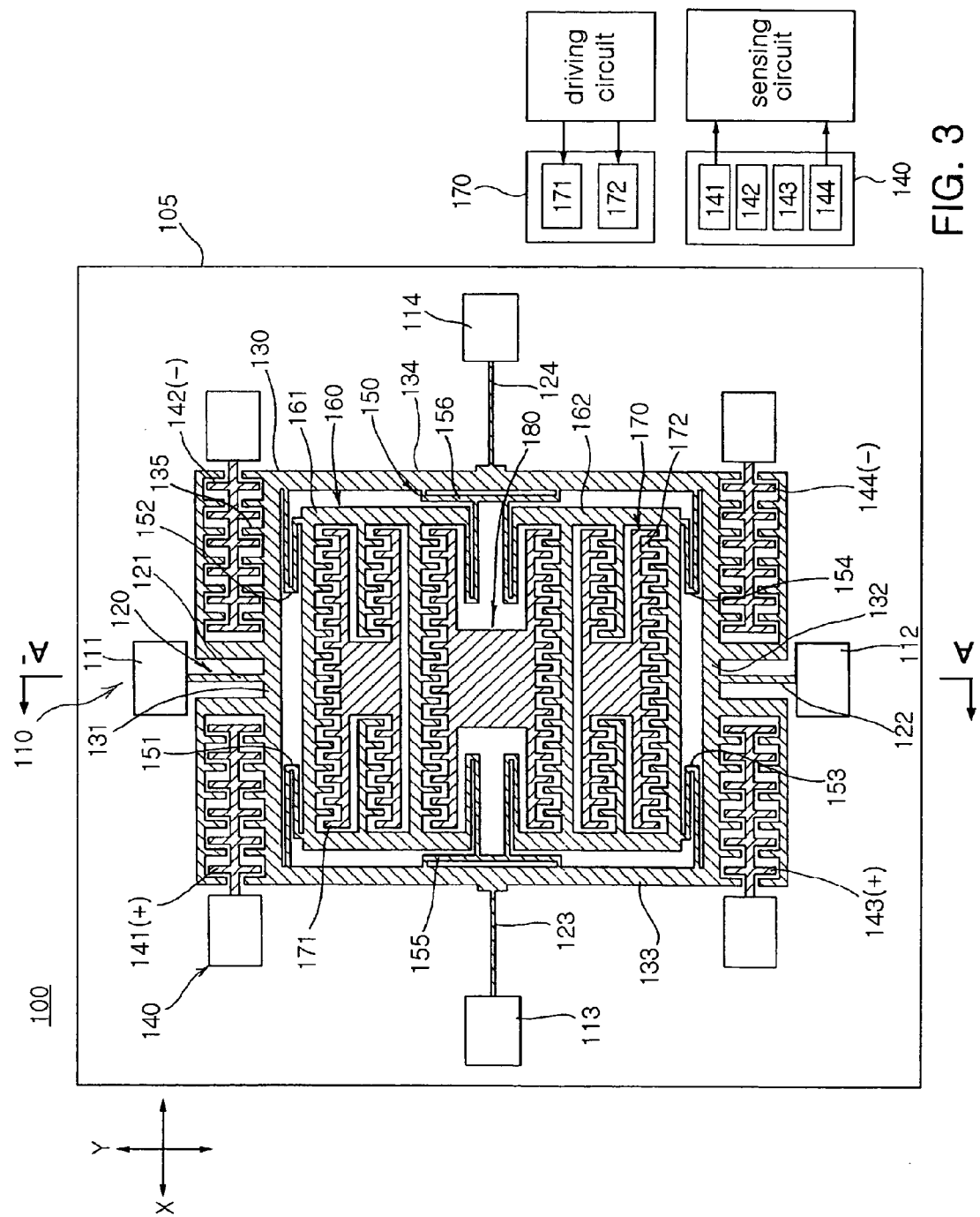
FIG. 3 is a plan view illustrating a horizontal and tuning fork vibratory microgyroscope according to a first preferred embodiment of the present invention.

FIG. 3 is a plan view illustrating a horizontal and tuning fork vibratory microgyroscope according to a first preferred embodiment of the present invention. As shown in FIG. 3, the horizontal and tuning fork vibratory microgyroscope of the present invention comprises: a substrate 105 having a plane structure in the horizontal direction defined by a X-axis and a Y-axis substantially perpendicular to the X-axis; an anchored pad unit 110 including a plurality of anchored pads 111 to 114 anchored to the substrate 105; an outer elastic element unit 120 including a plurality of outer elastic elements 121 to 124 connected at one end thereof to the anchored pads 111 to 114 of the anchored pad unit 110, respectively; an outer frame 130 made substantially in the shape of a square and connected to the other end of each of the plurality of outer elastic elements 121 to 124 of the outer elastic element unit 120 while the outer frame 130 is spaced apart from the substrate 105 by a predetermined gap, the outer frame 130 having vibrating electrode fingers 135 forming a comb structure; a sensing electrode unit 140 including a plurality of sensing electrodes 141 to 144 forming a comb structure, the sensing electrodes 141 to 144 meshing with the vibrating electrode fingers 135 of the outer frame 130 while the sensing electrodes 141 to 144 are spaced apart from the vibrating electrode fingers 135 by a predetermined gap, respectively; an inner elastic element unit 150 including a plurality of inner elastic elements 151 to 156 connected to the inside of the outer frame 130; an inner weighted element unit 160 including a pair of first and second inner weighted elements 161 and 162 each having a driven comb, the first and second inner weighted elements 161 and 162 being connected to the other end of the plurality of inner elastic elements 151 to 156 of the inner elastic element unit 150, respectively; and a driven electrode unit 170 including first and second driven electrodes 171 and 172 each having a comb drive forming a comb structure, the first and second driven electrodes 171 and 172 meshing with the first and second inner weighted elements 161 and 162 of the inner weighted element unit 160 while the first and second driven electrodes 171 and 172 are spaced apart from the first and second inner weighted elements 161 and 162 by a predetermined gap, respectively.

The outer elastic element unit 120 includes first to fourth outer elastic elements 121 to 124. Each of the first to fourth outer elastic elements 121 to 124 is connected to the outer center of each side of the outer frame 130. The first to fourth outer elastic elements 121 to 124 have the same structure.

The outer frame 130 includes two sides 131 and 132 spaced apart from each other in the direction of the X-axis, and two other sides 133 and 134 spaced apart from each other in the direction of the Y-axis, which substantially form a square. The vibrating electrode fingers 135 of the outer frame 130 are formed at outer parts of the two sides 131 and 132 in the direction of the X-axis, respectively, so that the vibrating electrode fingers 135 of the outer frame 130 are arranged in the form of a comb structure in the direction of the Y-axis, respectively.

The plurality of inner elastic elements 151 to 156 of the inner elastic element unit 150 include first to fourth inner elastic elements 151 to 154 each inwardly extended from both ends of each of the two sides 133 and 134 disposed in the direction of the Y-axis among the four sides of the outer frame 130, and fifth and sixth inner elastic elements 155 and 156 each inwardly extended from center of each of the two sides 133 and 134 disposed in the direction of the Y-axis among the four sides of the outer frame 130. FIG. 3 also shows a feedback electrode unit 180, which is disposed between the pair of inner weighted elements 161 and 162 of the inner weighted element unit 160.

Figure 4A:
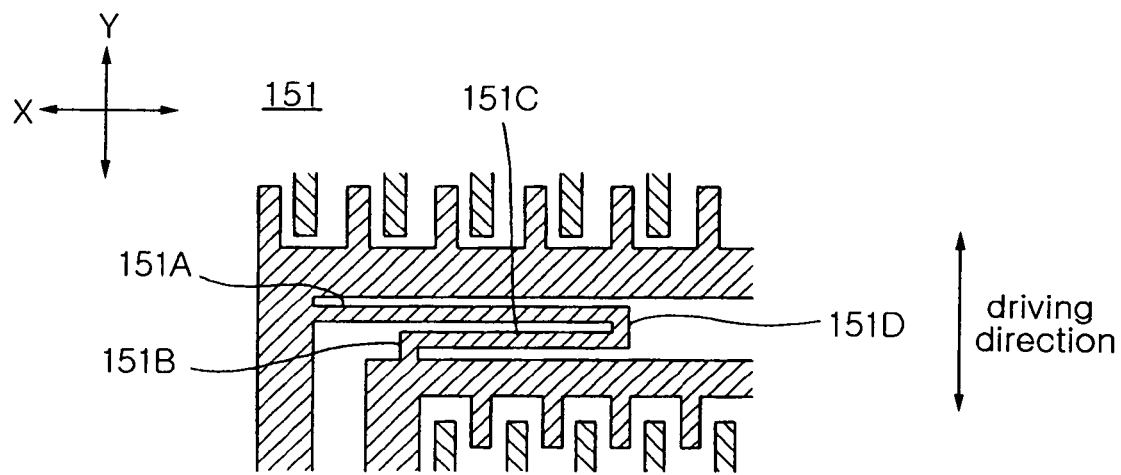
FIGS. 4a and 4b are enlarged views illustrating an inner elastic element unit of the horizontal and tuning fork vibratory microgyroscope according to the first preferred embodiment of the present invention of FIG. 3, respectively.
Figure 4B:
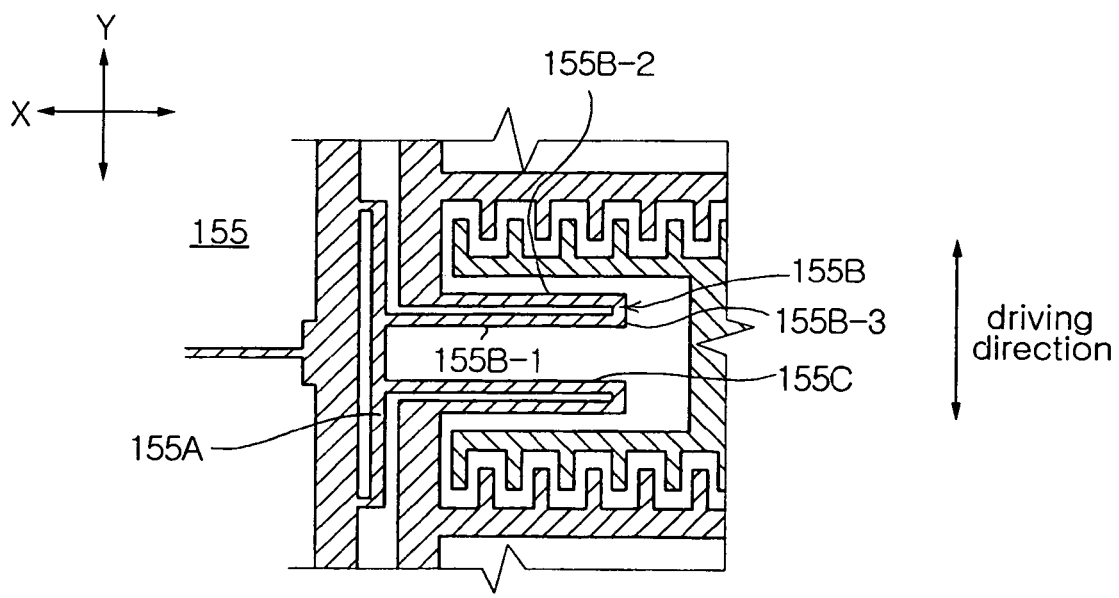

FIGS. 4a and 4b are enlarged views illustrating the inner elastic element unit of FIG. 3, respectively. As shown in FIGS. 3 and 4a, the first to fourth inner elastic elements 151 to 154 have substantially the same structure so that the first to fourth inner elastic elements 151 to 154 correspond to each other. The first inner elastic element 151 includes: an outer connection part 151A connected in the direction of the X-axis to the inside of the two sides 133 and 134 of the outer frame 130 arranged in the direction of the Y-axis; an inner connection part 151B connected to the outside of the inner weighted element unit 160 in the direction of the Y-axis; an extension part 151C extended from the end of the inner connection part 151B in the direction of the X-axis; and a bent connection part 151D for connecting the outer connection part 151A and the extension part 151C.

Each of the second to fourth inner elastic elements 152 to 154 also includes an outer connection part, an inner connection part, an extension part, and a bent connection part, which are basically identical to those of the first inner elastic element 151. In other words, the structure of each of the second to fourth inner elastic elements 152 to 154 is identical to that of the first inner elastic element 151, although the direction of arrangement and the position of connection of each of the first to fourth inner elastic elements 151 to 154 are such that they can uniformly and elastically support the inner weighted element unit 160. The length of the outer connection part of each of the first to fourth inner elastic elements is larger than the length of the extension part of each of the first to fourth inner elastic elements. Also, the length of the extension part of each of the first to fourth inner elastic elements is larger than the length of the inner connection part of each of the first to fourth inner elastic elements. Preferably, the outer connection part and the extension part are arranged parallel with each other in the direction of the X-axis.

As described above, each of the first to fourth inner elastic elements 151 to 154 is constructed so that vibration is reduced in the direction of the X-axis while a relatively large vibration is generated in the direction of the Y-axis.

As shown in FIGS. 3 and 4b, the fifth and sixth inner elastic elements 155 and 156 have substantially the same structure such that the fifth and sixth inner elastic elements 155 and 156 correspond to each other. The fifth inner elastic element 155 includes: a body part 155A formed at the inside center of each of the two sides 133 and 134 of the outer frame 130 arranged in the direction of the Y-axis; and a pair of arm parts 155B and 155C each having one end connected to the body part 155A and the other end connected to each of the pair of inner weighted elements 161 and 162. The body part 155A is formed in the shape of "]", and both ends of the body part 155A are connected to the inside of the outer frame 130.

The pair of arm parts 155B and 155C are symmetrical to each other about the X-axis. The arm part 155B includes: an outer connection part 155B-1 connected to the body part 155A so that the outer connection part 155B-1 has a predetermined length in the direction of the X-axis; an inner connection part 155B-2 connected to the outside of the inner weighted element unit 160 so that the inner connection part 155B-2 has a predetermined length in the direction of the X-axis; and a bent connection part 155B-3 for connecting the outer connection part 155B-1 and the inner connection part 155B-2. The length of the outer connection part 155B-1 is larger than the length of the inner connection part 155B-2. Preferably, the pair of arm parts of each of the fifth and sixth inner elastic elements 155 and 156 are formed with the same width so that the pair of the inner weighted elements 161 and 162 are coupled with each other to operate in the tuning fork mode. Each of the fifth and sixth inner elastic elements 155 and 156 is also preferably formed in the shape of "n", which is obtained by combination of the body part and the pair of arm parts.

As described above, each of the fifth and sixth inner elastic elements 155 and 156 is constructed so that vibration is reduced in the direction of the X-axis while a relatively large vibration is generated in the direction of the Y-axis. Consequently, the aforesaid inner elastic elements 151 to 156 can be largely vibrated in the direction of the Y-axis so that the pair of the inner weighted elements are driven in the tuning fork mode in the direction of the Y-axis among the horizontal direction.

Figure 5A:
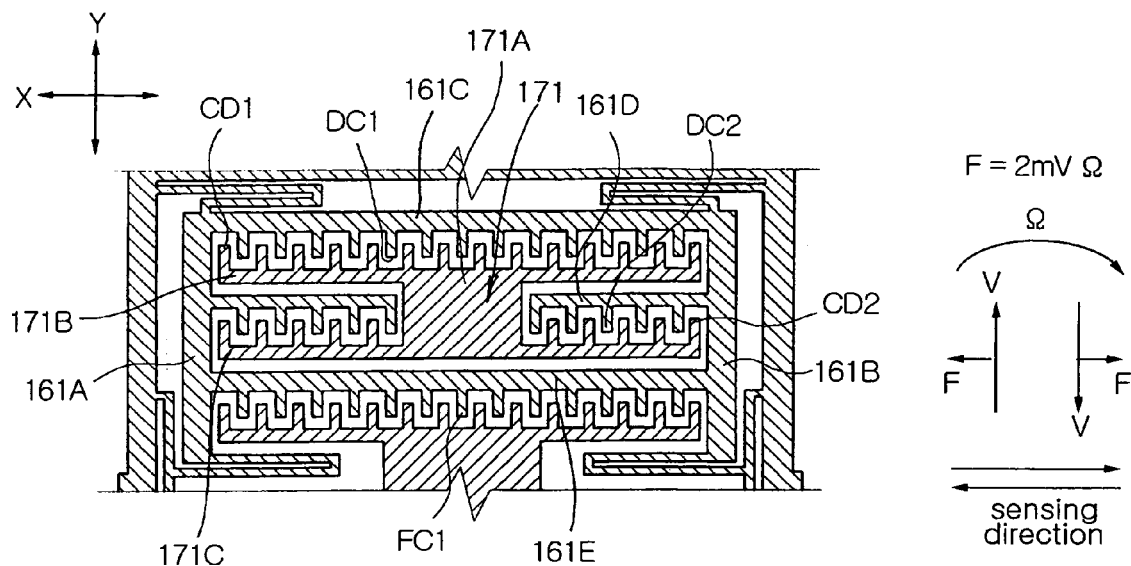
FIGS. 5a and 5b are enlarged views illustrating an inner weighted element unit and a driven electrode unit of the horizontal and tuning fork vibratory microgyroscope according to the first preferred embodiment of the present invention of FIG. 3, respectively.
Figure 5B:
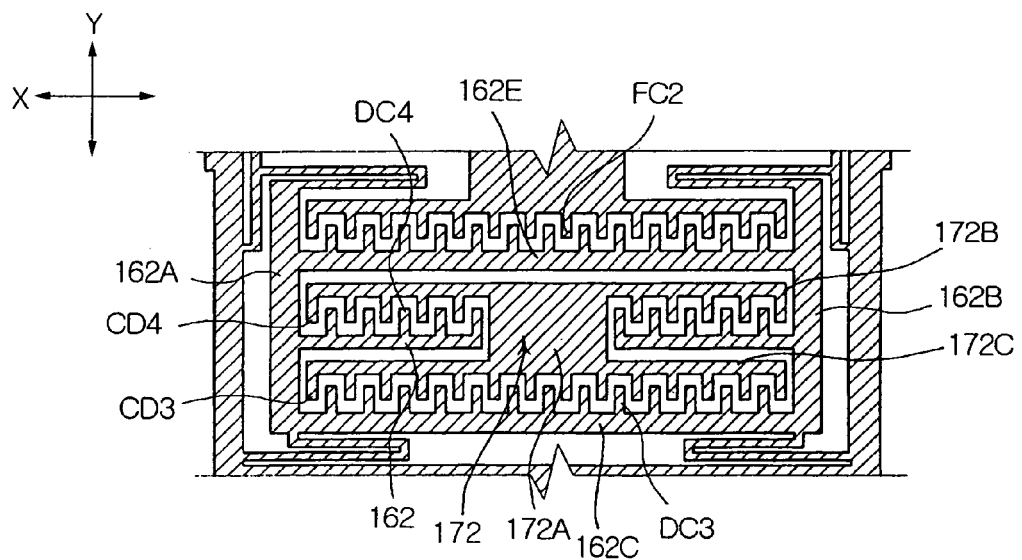

FIGS. 5a and 5b are enlarged views illustrating the inner weighted element unit 160 and the driven electrode unit 170 of FIG. 3, respectively. As shown in FIGS. 3, 5a and 5b, the inner weighted element unit 160 includes the pair of first and second inner weighted elements 161 and 162. Preferably, the pair of first and second inner weighted elements 161 and 162 are symmetrical to each other and formed with substantially the same structure to accomplish more accurate driving and sensing operations.

As shown in FIGS. 3 and 5a, the first inner weighted element 161 includes: two weighted element frames 161A and 161B spaced apart from each other in the direction of the Y-axis, each of the weighted element frames 161A and 161B having one end connected to one of the arm parts of each of the fifth and sixth inner elastic elements 155 and 156 of the inner elastic element unit 150, and the other end connected to each of the first and second inner elastic elements 151 and 152; two frame driving beams 161C and 161D disposed between the weighted element frames 161A and 161B and extended in the direction of the X-axis; two driven combs DC1 and DC2 repetitively arranged in the direction of the X-axis along the frame driving beams 161C and 161D, respectively; a frame sensing beam 161E connected between the weighted element frames 161A and 161B in the direction of the X-axis and spaced apart from the frame driving beams 161C and 161D by a predetermined gap; and a feedback comb FC1 formed at the frame sensing beam 161E and repetitively arranged in the direction of the X-axis. One of the frame driving beams 161C may be constructed so that the frame driving beam 161C is connected between the weighted element frames 161A and 161B in the direction of the X-axis.

As shown in FIGS. 3 and 5a, the first driven electrode 171 of the driven electrode unit 170 includes: a driven electrode pad 171A fixed to the substrate 105 and disposed between the weighted element frames 161A and 161B of the first weighted element 161; driven electrode beams 171B and 171C extended from the driven electrode pad 171A such that each of the driven electrode beams 171B and 171C has a predetermined length in the direction of the X-axis while the driven electrode beams 171B and 171C are spaced apart from the frame driving beams 161C and 161D by a predetermined gap, respectively; and comb drives CD1 and CD2 forming comb structures repetitively arranged along the longitudinal directions of the driven electrode beams 171B and 171C, respectively.

As shown in FIGS. 3 and 5b, the second inner weighted element 162 includes: two weighted element frames 162A and 162B spaced apart from each other in the direction of the Y-axis, each of the weighted element frames 161A and 161B having one end connected to the other of the arm parts of each of the fifth and sixth inner elastic elements 155 and 156 of the inner elastic element unit 150, and the other end connected to each of the third and fourth inner elastic elements 153 and 154; two frame driving beams 162C and 162D disposed between the weighted element frames 162A and 162B and extended in the direction of the X-axis; two driven combs DC3 and DC4 repetitively arranged in the direction of the X-axis along the frame driving beams 162C and 162D, respectively; a frame sensing beam 162E connecting the weighted element frames 162A and 162B in the direction of the X-axis and spaced apart from the frame driving beams 162C and 162D by a predetermined gap; and a feedback comb FC1 formed at the frame sensing beam 162E and repetitively arranged in the direction of the X-axis. The other of the frame driving beams 162C may be constructed so that the frame driving beam 161C is connected between the weighted element frames 162A and 162B in the direction of the X-axis.

As shown in FIGS. 3 and 5b, the second driven electrode 172 of the driven electrode unit 170 includes: a driven electrode pad 172A fixed to the substrate 105 and disposed between the weighted element frames 162A and 162B of the second weighted element 162; driven electrode beams 172B and 172C extended from the driven electrode pad 172A so that each of the driven electrode beams 172B and 172C has a predetermined length in the direction of the X-axis while the driven electrode beams 172B and 172C are spaced apart from the frame driving beams 162C and 162D by a predetermined gap, respectively; and comb drives CD3 and CD4 forming comb structures repetitively arranged along the longitudinal direction of the driven electrode beams 172B and 172C, respectively.

When a driving signal having a resonant frequency is applied to the driven electrode unit 170 of the horizontal and tuning fork vibratory microgyroscope of the present invention by means of a driving circuit, an electrostatic force is generated between the driven electrode unit 170 and the inner weighted element unit 160. By means of the electrostatic force, the first inner weighted element 161 is driven in the direction of the Y-axis while being synchronized with the resonant frequency of the driving signal. By means of the electrostatic force, the second inner weighted element 162 is also driven in the direction of the Y-axis while being synchronized with the resonant frequency of the driving signal. With the resonance of the first inner weighted elements 161, the pair of first and second inner weighted elements 161 and 162 are moved in a horizontal tuning fork mode in which the inner weighted elements 161 and 162 are alternately close to or away from each other in the direction of the Y-axis while facing each other. At this time, the first and second inner weighted elements 161 and 162 are accurately coupled with each other by virtue of the structure of the inner elastic elements 151 to 156 of the present invention.

Figure 6:
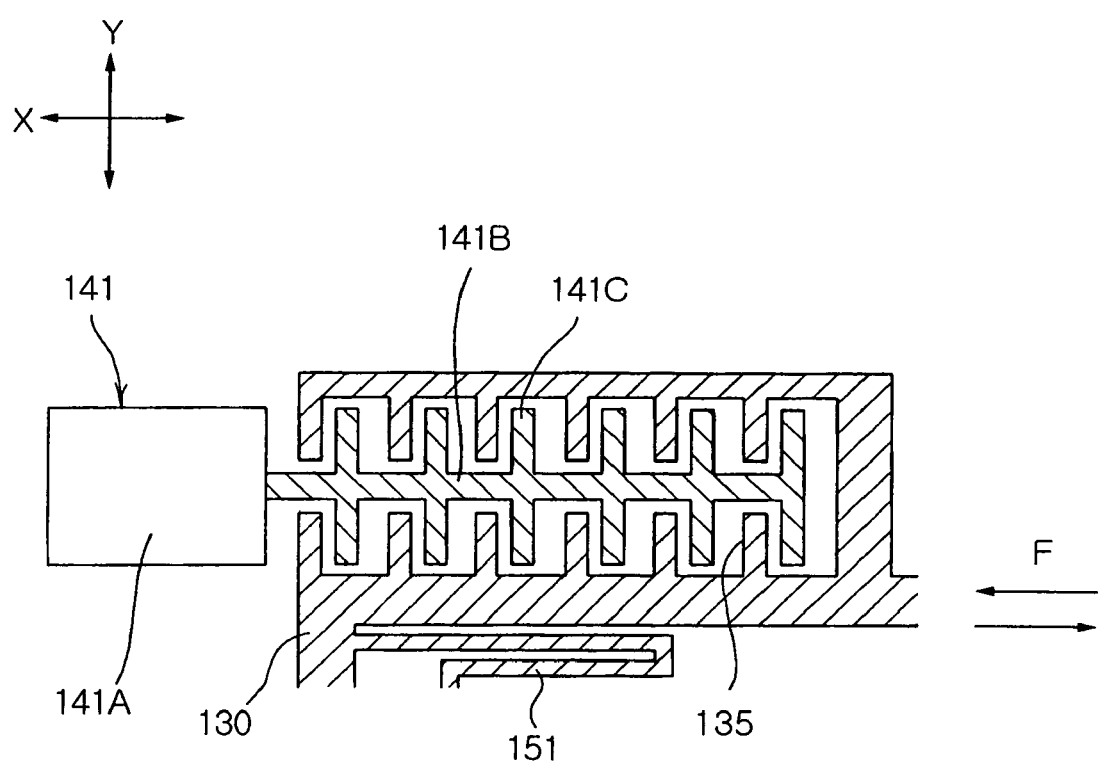
FIG. 6 is an enlarged view illustrating a sensing electrode unit of the horizontal and tuning fork vibratory microgyroscope according to the first preferred embodiment of the present invention of FIG. 3.

FIG. 6 is an enlarged view illustrating the sensing electrode unit of FIG. 3. As shown in FIGS. 3 and 6, the first to fourth sensing electrodes 141 to 144 of the sensing electrode unit 140 have substantially the same structures, which are symmetrical about the Y-axis and the X-axis, respectively. The first sensing electrode 141 of the sensing electrode unit 140 includes: a sensing electrode pad 141A fixed to the substrate 105; a sensing electrode beam 141B extended from the sensing electrode pad 141A in the direction of the X-axis; and a plurality of sensing electrode fingers 141C forming a comb structure, the sensing electrode fingers 141C being formed at the sensing electrode beam 141B and arranged in the direction of the X-axis, the sensing electrode fingers 141C meshing with the vibrating electrode fingers 135 having the comb structure of the outer frame 130 while the sensing electrode fingers 141C are spaced apart from the vibrating electrode fingers 135 by a predetermined gap, respectively. The first sensing electrode 141 of the sensing electrode unit 140 with the above-stated construction serves to detect a capacitance based on the gap between the sensing electrode fingers 141C and the vibrating electrode fingers 135 of the outer frame 130.

When an angular velocity having a rotating axis perpendicular to the X-axis and the Y-axis of the microgyroscope is generated at the microgyroscope of the present invention while the pair of first and second weighted elements 161 and 162 are driven in the direction of the Y-axis in the tuning fork mode, Coriolis forces having opposite directions are applied to the pair of the inner weighted elements 161 and 162 in the direction of the X-axis, respectively, so that the inner weighted elements 161 and 162 are vibrated. The vibration of the inner weighted elements 161 and 162 is transmitted to the outer frame 130 via the inner elastic element unit 150. Consequently, the outer frame 130 is vibrated while being coupled with the inner weighted elements 161 and 162.

As the outer frame 130 is vibrated, the gap varies between the vibrating electrode fingers 135 of the outer frame 130 and the sensing electrode fingers 141C of the sensing electrode unit 140. The microgyroscope of the present invention detects a capacitance corresponding to the varying gap to measure the size of the external force or the self-vibration.

Figure 7:
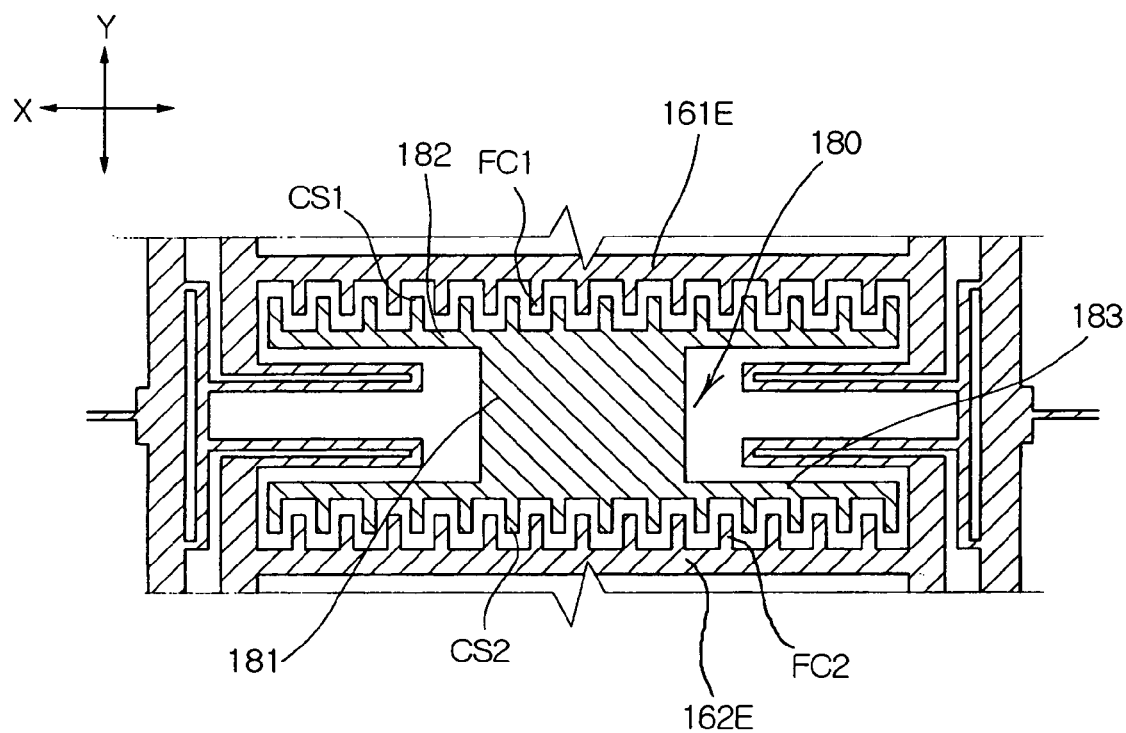
FIG. 7 is an enlarged view illustrating a feedback electrode unit of the horizontal and tuning fork vibratory microgyroscope according to the first preferred embodiment of the present invention of FIG. 3.

FIG. 7 is an enlarged view illustrating the feedback electrode unit of FIG. 3. As shown in FIG. 7, the microgyroscope of the present invention may comprise a feedback electrode unit 180 for detecting a driving frequency of the inner weighted element unit 160 to calibrate its vibration to an accurate natural frequency. The feedback electrode unit 180 is disposed between the pair of inner weighted elements 161 and 162, and detects a capacitance on the basis of the gap between the feedback electrode unit 180 and the feedback combs FC1 and FC2 of the inner weighted elements 161 and 162.

The feedback electrode unit 180 includes: a feedback electrode pad 181 fixed to the substrate 105; feedback electrode beams 182 and 183 extended from both ends of the feedback electrode pad 181 in the direction of the X-axis, the both ends of the feed back electrode pad 181 being formed in the direction of the Y-axis, respectively; and comb sensors CS1 and CS2 forming comb structures formed at the feedback electrode beams 182 and 183 and arranged in the direction of the X-axis, respectively, the comb sensors CS1 and CS2 meshing with the feedback combs FC1 and FC2 of the pair of inner weighted elements 161 and 162 while the comb sensors CS1 and CS2 are spaced apart from the feedback combs FC1 and FC2 by a predetermined gap, respectively. The feedback electrode unit 180 with the above-stated construction serves to detect a capacitance corresponding to varying gap between the comb sensors CS1 and CS2 and the feedback combs FC1 and FC2 for measuring the driven operation of the inner weighted element unit 160.

Figure 8:
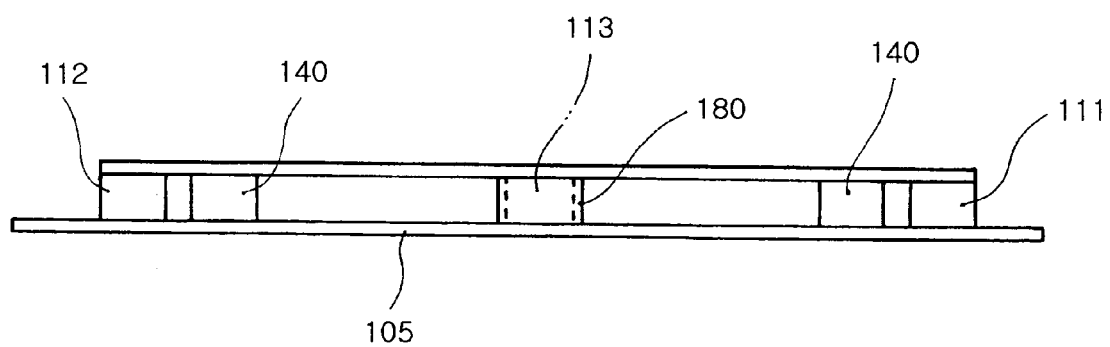
FIG. 8 is a cross-sectional view taken along line A–A' of FIG. 3.

FIG. 8 is a cross-sectional view taken along line A–A' of FIG. 3. As can be seen from FIGS. 3 and 8, the anchored pads 111 to 114 of the anchored pad unit 110, the pads of the sensing electrode unit 140, the driven electrodes 171 and 172 of the driven electrode unit 170, and the feedback electrode pad 181 of the feedback electrode unit 180 are anchored to the surface of the substrate 105. The other parts of the microgyroscope of the present invention are spaced apart from the substrate by a predetermined gap, respectively.

Referring to FIGS. 3–7, the comb drives for driving the inner weighted elements are repetitively arranged in the microgyroscope according to the first preferred embodiment of the present invention. The sensing electrodes for self-oscillation are also arranged in the shape of a comb. When self-oscillation is induced, the voltages applied to the upper and lower weighted elements are the same and have the resonant frequency corresponding to a first mode. The movement of the weighted elements induces a change in the capacitance of the sensing electrodes. The change in the capacitance of the sensing electrodes is detected on a circuit and fed back to the driven electrodes under a predetermined condition. At this time, at the microgyroscope of the present invention, there is generated the self-oscillation of the first resonance mode in which the microgyroscope is horizontally reciprocated in the direction of the Y-axis.

Also, when an external angular velocity is applied to the oscillated weighted elements, the microgyroscope is rotated clockwise or counterclockwise on the basis of the resonant frequency. Consequently, the first and second inner weighted elements 161 and 162 of the inner weighted element unit 160 of the present invention are vibrated in such a manner that the first and second inner weighted elements 161 and 162 move counter to each other in the direction of the X-axis. This vibration is controlled by the outer elastic element unit 120, and the outer frame 130 is moved clockwise or counterclockwise by the controlled vibration.

As a result, there is induced a change of capacitance based on the varying gap between the vibrating electrode fingers 135 of the outer frame 130 and the sensing electrodes (sensing+, sensing−). This is proportional to the angular velocity, and expressed as a signal modulated by the resonant frequency. Consequently, the angular velocity can be detected by demodulation using the signal of the self-oscillation. The grounding surface of the substrate, which electrically forms grounding, is electrically connected to the anchored pad unit. The anchored pad unit serves to structurally support the structure of the microgyroscope by means of the elastic elements.

In the horizontal and tuning fork vibratory microgyroscope according to the first preferred embodiment of the present invention, driving and sensing directions of the weighted elements are on the same horizontal plane, whereby accurately coupled tuning fork operation is guaranteed by the fact that the outer and inner elastic elements of the present invention have the same width on the horizontal plane. The same width can be obtained by the same manufacturing process. The above details are applied to the horizontal and tuning fork vibratory microgyroscope according to a second preferred embodiment of the present invention, which will be described hereinafter.

Figure 10:
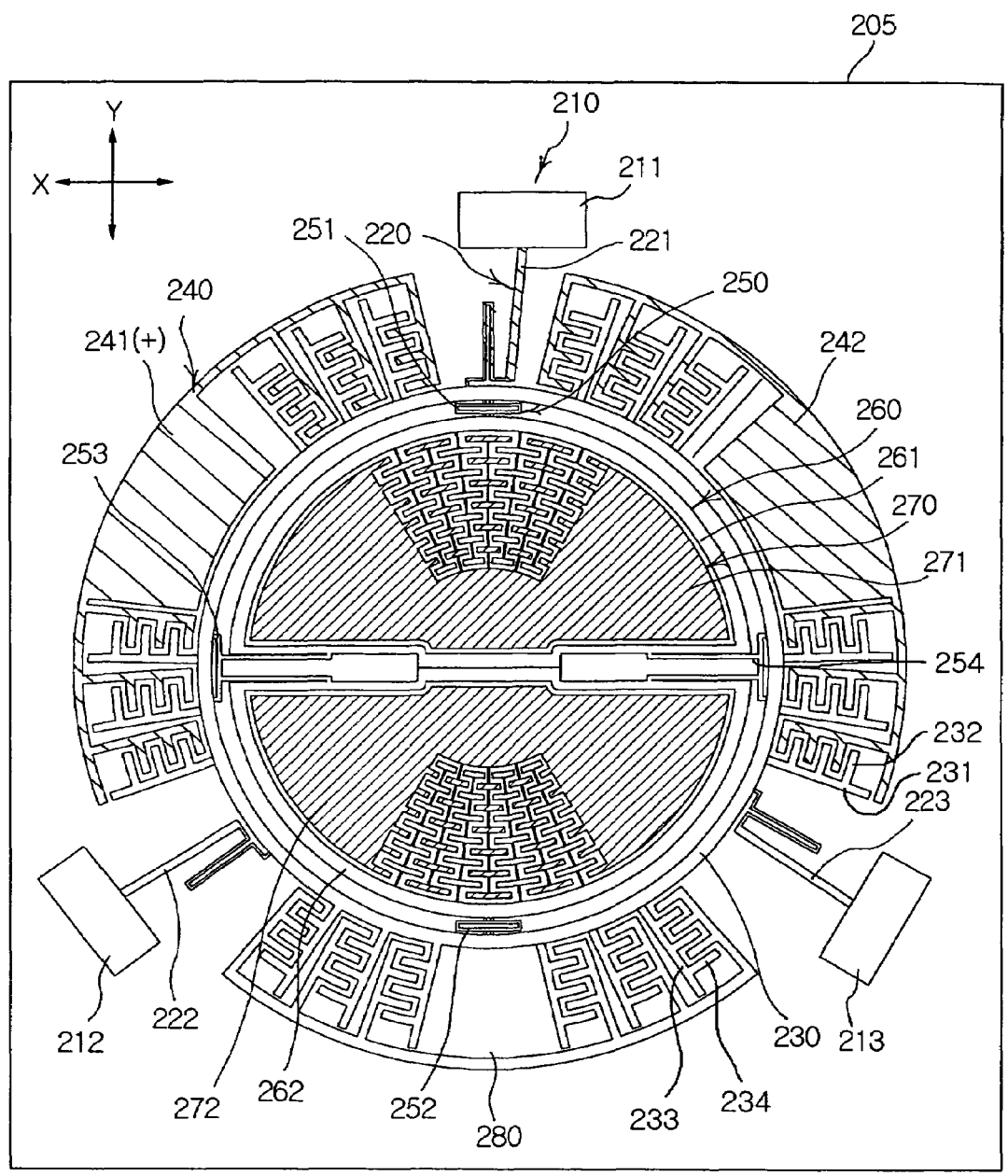
FIG. 10 is a plan view illustrating a horizontal and tuning fork vibratory microgyroscope according to the second preferred embodiment of the present invention.

FIG. 10 is a plan view illustrating a horizontal and tuning fork vibratory microgyroscope according to a second preferred embodiment of the present invention. As shown in FIG. 10, the horizontal and tuning fork vibratory microgyroscope of the present invention comprises: a substrate 205 having a plane structure in the horizontal direction defined by a X-axis and a Y-axis substantially perpendicular to the X-axis; an anchored pad unit 210 including a plurality of anchored pads 211 to 213 anchored to the substrate 205; an outer elastic element unit 220 including a plurality of outer elastic elements 221 to 223 connected at one end thereof to the anchored pads 211 to 213 of the anchored pad unit 210, respectively; an outer frame 230 made substantially in the shape of a circle and connected to the other end of each of the plurality of outer elastic elements 221 to 223 of the outer elastic element unit 220 while the outer frame 230 is spaced apart from the substrate 205 by a predetermined gap, the outer frame 230 including a driven electrode having driven electrode fingers 232 of a comb structure formed at the outside of the outer frame 230; a driven electrode unit 240 having driven electrode fingers 241C forming a comb structure, the driven electrode fingers 241C meshing with the driven electrode fingers 232 of the outer frame 230 while the driven electrode fingers 241C are spaced apart from the driven electrode fingers 232 by a predetermined gap, respectively; an inner elastic element unit 250 including a plurality of inner elastic elements 251 to 254 connected at one end thereof to the inside of the outer frame 230; an inner weighted element unit 260 including a pair of first and second inner weighted elements 261 and 262 having vibrating electrode fingers 261C and 262C forming comb structures, respectively, the first and second inner weighted elements 261 and 262 being connected to the other end of the plurality of inner elastic elements 251 to 254 of the inner elastic element unit 250, respectively; and a sensing electrode unit 270 including first and second sensing electrodes 271 and 272 having sensing electrode fingers 271C and 272C forming comb structures, respectively, the sensing electrode fingers 271C and 272C meshing with the vibrating electrode fingers 261C and 262C of the first and second inner weighted elements 261 and 262 of the inner weighted element unit 260 while the sensing electrode fingers 271C and 272C are spaced apart from the vibrating electrode fingers 261C and 262C by a predetermined gap, respectively.

The outer elastic element unit 220 includes first to third outer elastic elements 221 to 223 connected to the anchored pads 211 to 213 of the anchored pad unit 210, respectively, for uniformly and elastically supporting the outer frame 230. The first to third outer elastic elements 221 to 223 have the same structure.

The outer frame 230 has a driven electrode. The driven electrode includes: a plurality of driven electrode beams 231 formed at the outside of the outer frame 230 so that each of the driven electrode beams 231 has a predetermined length in the direction perpendicular to the outer frame 230; and electrode fingers 232 forming a comb structure arranged along the longitudinal direction of each of the driven electrode beams 231.

Figure 11A:
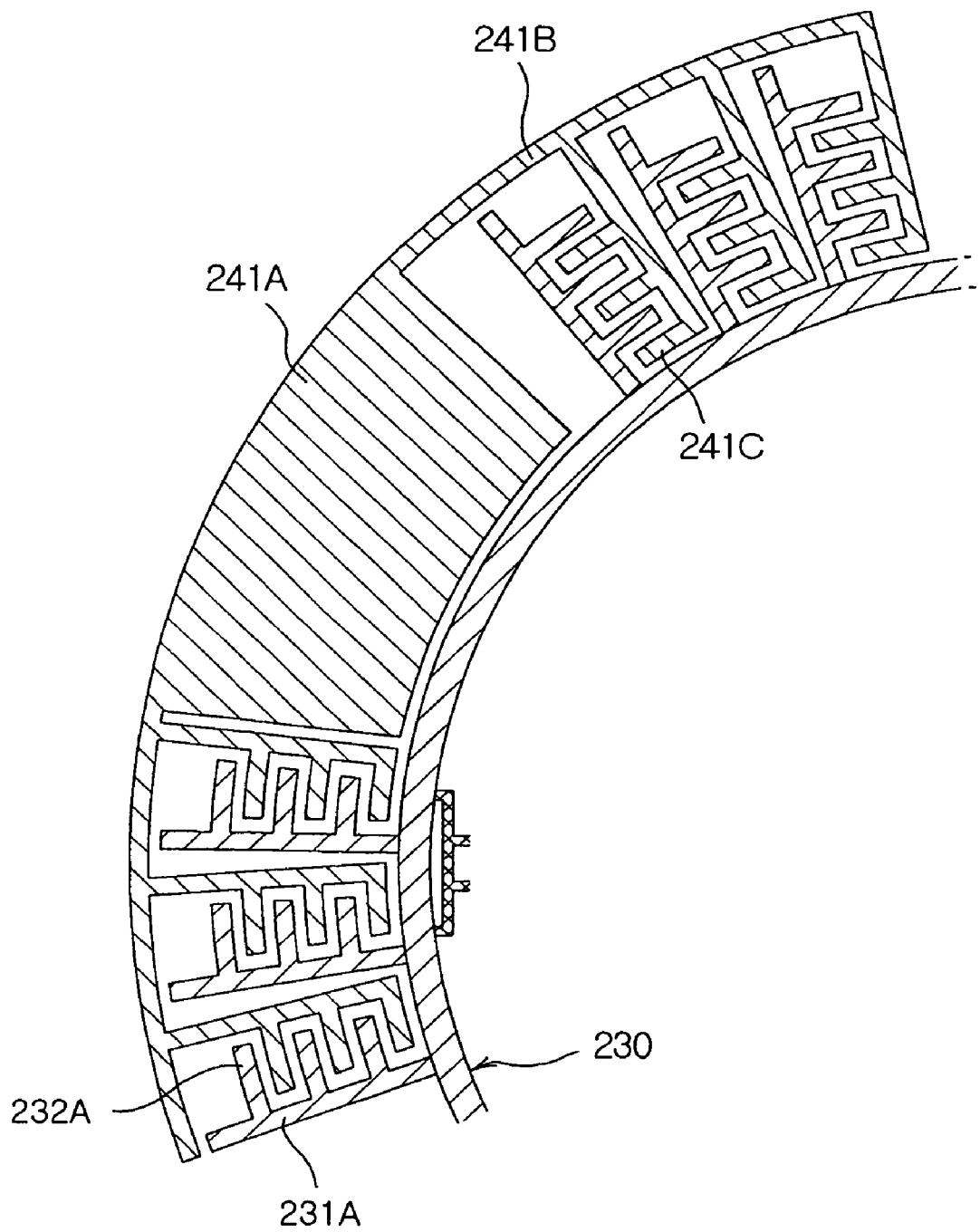
FIGS. 11a and 11b are enlarged views illustrating a driven electrode unit of the horizontal and tuning fork vibratory microgyroscope according to the second preferred embodiment of the present invention of FIG. 10, respectively.
Figure 11B:
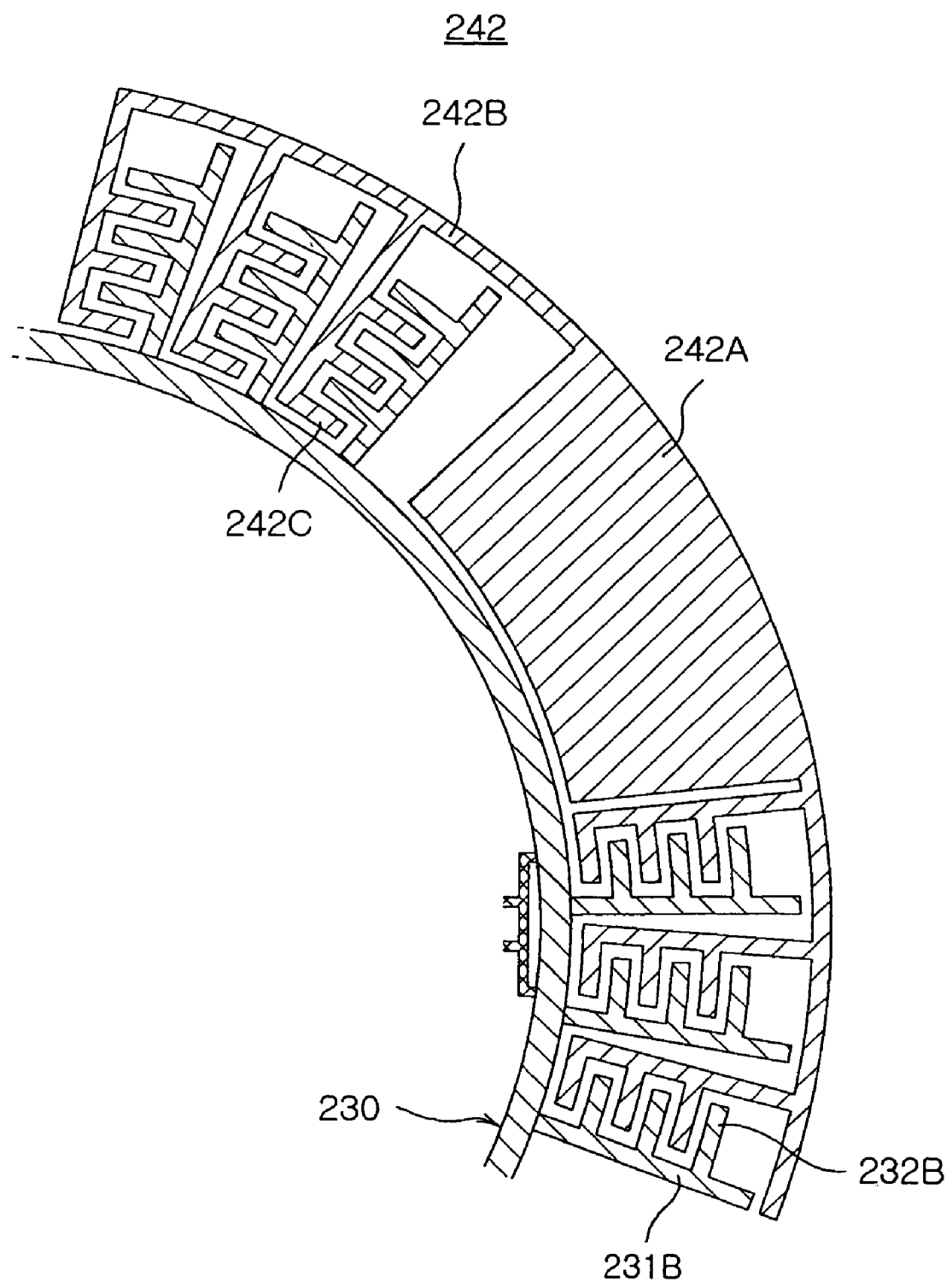

FIGS. 11a and 11b are enlarged views illustrating the driven electrode unit of FIG. 10, respectively. As shown in FIGS. 10 and 11a, the driven electrode unit 240 has the first and second driven electrodes 241 and 242. The first sensing electrode 241 of the driven electrode unit 240 includes: a driven electrode pad 241A fixed to the substrate 205; a driven electrode beam 241B having a predetermined length and extended from the driven electrode pad 241A while the driven electrode beam 241B is spaced apart from the driven electrode beam 231A of the outer frame 230 by a predetermined gap; and driven electrode fingers 241C forming a comb structure formed at the driven electrode beam 241B and meshing with the driven electrode fingers 232A having the comb structure of the outer frame 230 while the driven electrode fingers 241C are spaced apart from the driven electrode fingers 232A of the outer frame by a predetermined gap, respectively.

As shown in FIGS. 10 and 11b, the driven electrode unit 240 comprises the first and second driven electrodes 241 and 242. The second sensing electrode 242 of the driven electrode unit 240 includes: a driven electrode pad 242A fixed to the substrate 205; a driven electrode beam 242B having a predetermined length and extended from the driven electrode pad 242A while the driven electrode beam 242B is spaced apart from the driven electrode beam 231B of the outer frame 230 by a predetermined gap; and driven electrode fingers 242C forming a comb structure formed at the driven electrode beam 242B and meshing with the driven electrode fingers 232B having the comb structure of the outer frame 230 while the driven electrode fingers 242C are spaced apart from the driven electrode fingers 232B by a predetermined gap, respectively.

When a driving signal having a resonant frequency is applied to the driven electrode unit 240 of the horizontal and tuning fork vibratory microgyroscope of the present invention by means of a driving circuit, an electrostatic force is generated between the driven electrode unit 240 and the driven electrode of the outer frame 230. By means of the electrostatic force, the outer frame 230 is driven in the direction of its circumference while being synchronized with the, resonant frequency of the driving signal. The driving force of the outer frame 230 is transmitted to the inner weighted element unit 260 via the inner elastic element unit 250. Consequently, the inner weighted elements 261 and 262 of the inner weighted element unit 260 are driven while being coupled with the resonance of the outer frame 230. At this time, the first and second inner weighted elements 261 and 262 are accurately coupled with each other by virtue of the structure of the inner elastic elements 251 to 254 of the present invention.

As also shown in FIGS. 10 and 11, the inner elastic element unit 250 includes: first and second inner elastic elements 251 and 252 inwardly extended from the inner circumference of the outer frame 230 while the first and second inner elastic elements 251 and 252 are opposite to each other in the direction of the Y-axis; and third and fourth inner elastic elements 253 and 254 inwardly extended from the inner circumference of the outer frame 230 while the first and second inner elastic elements 251 and 252 are opposite to each other in the direction of the X-axis.

Figure 12A:
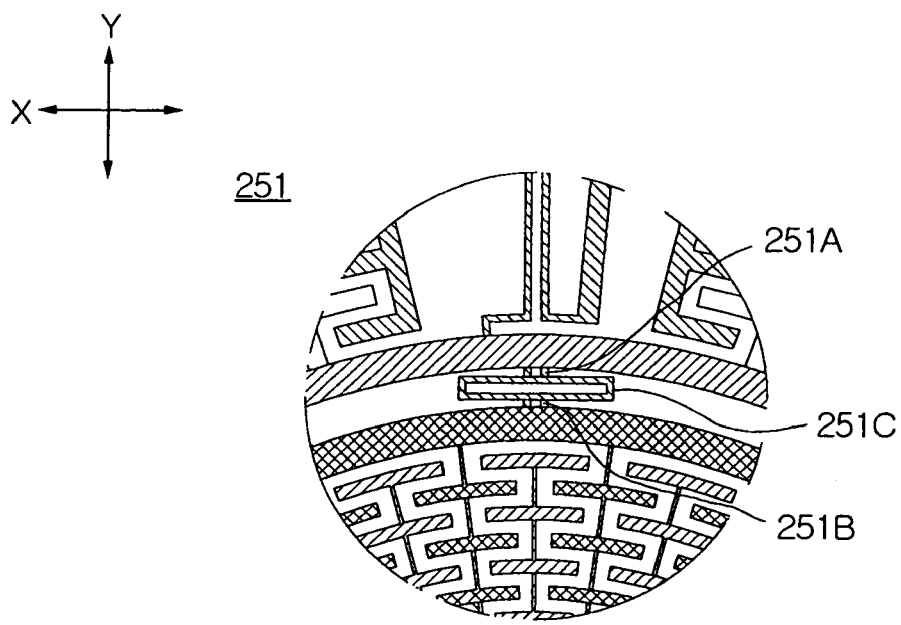
FIGS. 12a and 12b are enlarged views illustrating an inner elastic element unit of the horizontal and tuning fork vibratory microgyroscope according to the second preferred embodiment of the present invention of FIG. 10, respectively.
Figure 12B:
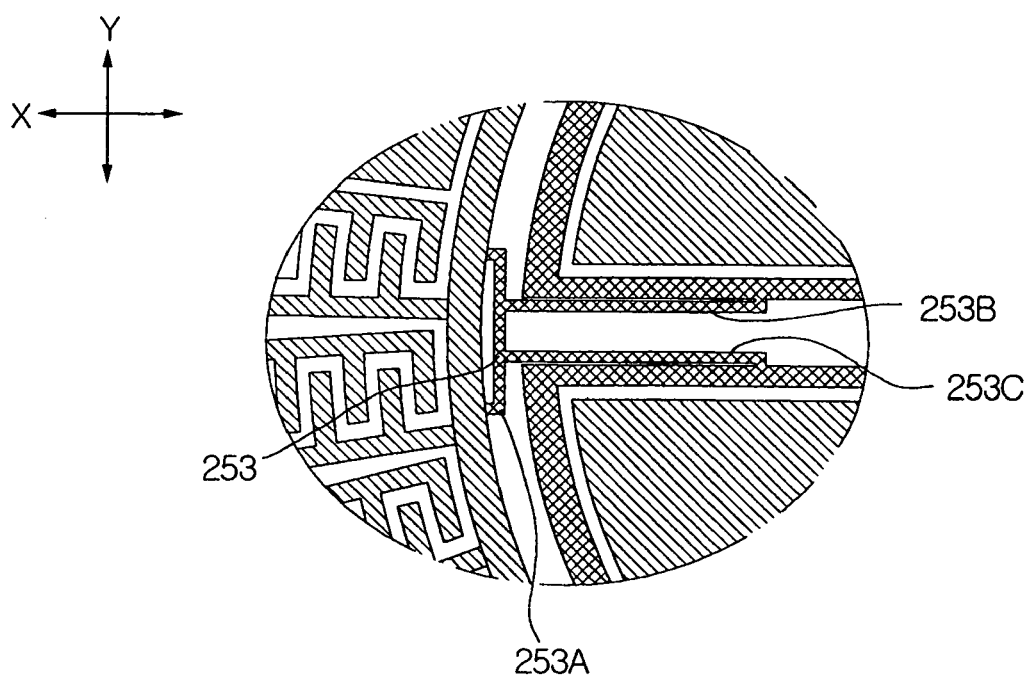

FIGS. 12a and 12b are enlarged views illustrating the inner elastic element unit of FIG. 10, respectively. As shown in FIGS. 10 and 12a, the first and second inner elastic elements 251 and 252 are symmetrical to each other and formed with substantially the same structure. The first inner elastic element 251 of the inner elastic element unit 250 includes: an outer connection part 251A connected to the inside of the outer frame 230 in the direction of the Y-axis; an inner connection part 251B connected to the outside of the inner weighted element unit 260 in the direction of the Y-axis; and an interconnection part 251C having a predetermined length in the direction of the X-axis for interconnecting the outer connection part 251A and the inner connection part 251B. The length of the interconnection part 251C is larger than that of the outer connection part 251A or that of the inner connection part 251B. As can be seen from FIGS. 10 and 12a, the first and second inner elastic elements 251 and 252 are constructed in such a manner that the movement of the outer frame 230 is transmitted to the inner weighted element unit 260, and the inner weighted element unit 260 is vibrated in the direction of the Y-axis.

As shown in FIGS. 10 and 12b, the third and fourth inner elastic elements 253 and 254 are symmetrical to each other and formed with the substantially same structure. The third inner elastic element 253 of the inner elastic element unit 250 includes: a body part 253A formed on the inner circumference of the outer frame 230; and a pair of arm parts 253B and 253C extended from the body part 253A so that each of the arm parts 253B and 253C has a predetermined length in the direction of the X-axis, the arm parts 253B and 253C being connected to the pair of inner weighted elements 261 and 262, respectively. Preferably, the pair of arm parts of each of the third and fourth inner elastic elements 253 and 254 are formed with the same width. Each of the third and fourth inner elastic elements 253 and 254 is also preferably formed in the shape of "n", which is obtained by combination of the body part and the pair of arm parts.

As described above, each of the third and fourth inner elastic elements 253 and 254 is constructed so that vibration is reduced in the direction of the X-axis while a relatively large vibration is generated in the direction of the Y-axis. Consequently, the structure of the inner elastic element unit 250 can be vibrated heavily in the direction of the Y-axis enabling the pair of inner weighted elements 261 and 262 to resonate in the direction of the Y-axis in the shape of a tuning fork in the sensing mode.

As also shown in FIGS. 10 and 12, the pair of first and second inner weighted elements 261 and 262 of the inner weighted element unit 260 are disposed in the outer frame while the inner weighted elements 261 and 262 are spaced apart from each other by a predetermined gap in the direction of the Y-axis. Preferably, each of the first and second inner weighted elements 261 and 262 is formed in the shape of a semicircle. Also, the first and second inner weighted elements 261 and 262 are preferably symmetrical to each other about the X-axis, and the first inner weighted element 261 has a structure substantially identical to that of the second inner weighted element 262.

Figure 13A:
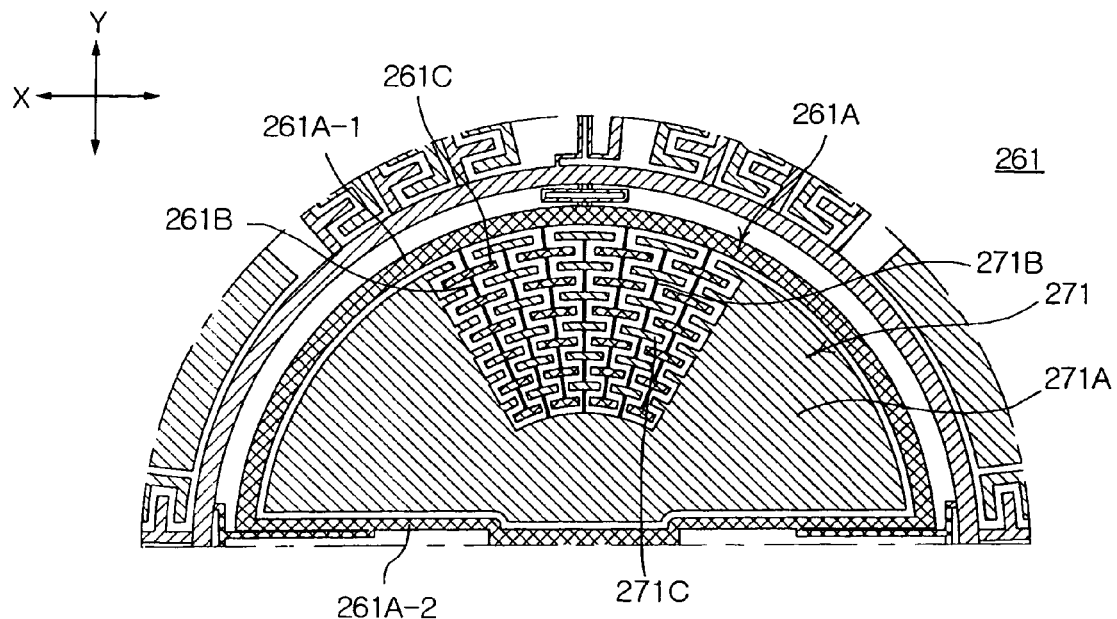
FIGS. 13a and 13b are enlarged views illustrating an inner weighted element unit and a sensing electrode unit of the horizontal and tuning fork vibratory microgyroscope according to the second preferred embodiment of the present invention of FIG. 10, respectively.
Figure 13B:
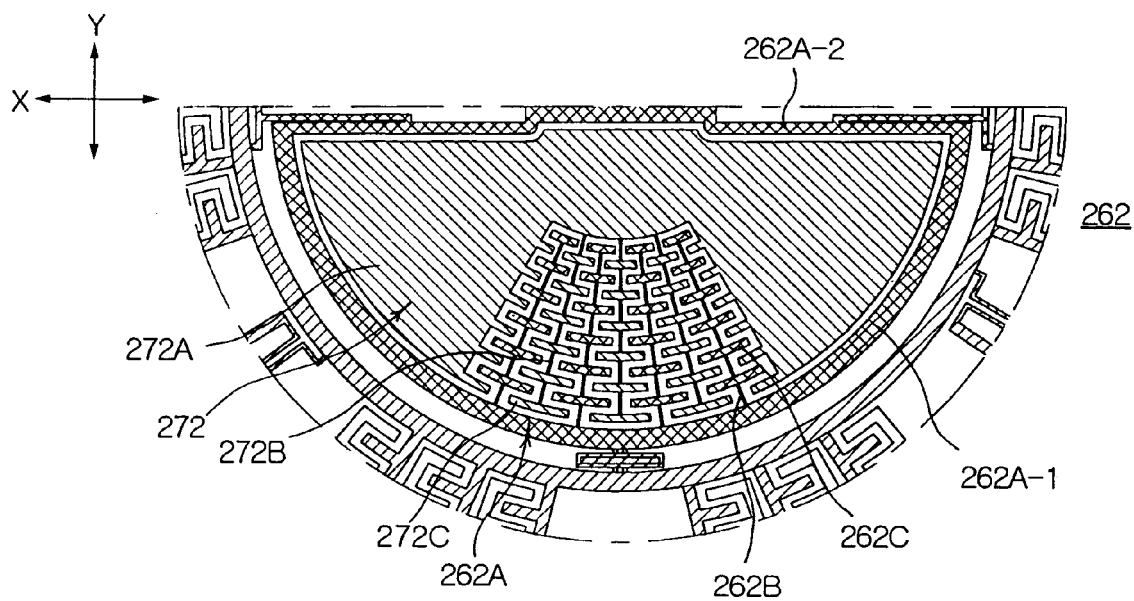

FIGS. 13a and 13b are enlarged views illustrating the inner weighted element unit and the sensing electrode unit of FIG. 10, respectively. As shown in FIGS. 10 and 13a, the first inner weighted element 261 of the inner weighted element unit 260 includes: a weighted element frame 261A disposed at one side in the outer frame 230 in the direction of the Y-axis and having an inner space defined therein, the weighted element frame 261A comprising a semicircular frame part 261A-1 formed along the inner circumference of the outer frame 230 while the semicircular frame part 261A-1 is spaced apart from the inner circumference of the outer frame 230 by a predetermined gap, and a linear frame part 261A-2 formed in the direction of the X-axis while the linear frame part 261A-2 is spaced apart from the second inner weighted element 262 by a predetermined gap; weighted element beams 261B formed at the weighted element frame 261A and each having a predetermined length in the inner space of the weighted element frame 261A; and weighted element fingers 261C forming comb structures arranged longitudinally to the weighted element beams 261B, respectively, and each having a predetermined length in the direction parallel to the semicircular frame part 261A-1 of the weighted element frame 261A.

As shown in FIGS. 10 and 13b, the second inner weighted element 262 of the inner weighted element unit 260 includes: a weighted element frame 262A disposed at the other side in the outer frame 230 in the direction of the Y-axis and having an inner space defined therein, the weighted element frame 262A comprising a semicircular frame part 262A-1 formed along the inner circumference of the outer frame 230 while the semicircular frame part 262A-1 is spaced apart from the inner circumference of the outer frame 230 by a predetermined gap, and a linear frame part 262A-2 formed in the direction of the X-axis while the linear frame part 262A-2 is spaced apart from the linear frame part 261A-2 of the first inner weighted element 261 by a predetermined gap; weighted element beams 262B formed at the weighted element frame 262A and each having a predetermined length in the inner space of the weighted element frame 262A; and weighted element fingers 262C forming comb structures arranged in the longitudinal directions of the weighted element beams 262B, respectively, and each having a predetermined length in the direction parallel to the semicircular frame part 262A-1 of the weighted element frame 262A.

As also shown in FIGS. 10 and 13a, the first sensing electrode 271 of the sensing electrode unit 270 includes: a sensing electrode pad 271A disposed in the inner space of the first inner weighted element 261 and fixed to the substrate 205; sensing electrode beams 271B extended from the sensing electrode pad 271A and disposed between the weighted element beams 261B of the first weighted element 261 so that the sensing electrode beams 271B and the weighted element beams 261B are alternately arranged; and sensing electrode fingers 271C formed at the sensing electrode beam 271B, the sensing electrode fingers 271C being radially arranged and meshing with the weighted element fingers 261C, of the first weighted element 261 while the sensing electrode fingers 271C are spaced apart from the weighted element fingers 261C, respectively.

As also shown in FIGS. 10 and 13b, the second sensing electrode 272 of the sensing electrode unit 270 includes: a sensing electrode pad 272A disposed in the inner space of the second inner weighted element 262 and fixed to the substrate 205; sensing electrode beams 272B extended from the sensing electrode pad 272A and disposed between the weighted element beams 262B of the first weighted element 262 so that the sensing electrode beams 272B and the weighted element beams 262B are alternately arranged; and sensing electrode fingers 272C formed at the sensing electrode beam 272B, the sensing electrode fingers 272C being radially arranged and meshing with the weighted element fingers 262C of the first weighted element 262 while the sensing electrode fingers 272C are spaced apart from the weighted element fingers 262C, respectively.

When an angular velocity having a rotating axis perpendicular to the X-axis and the Y-axis of the microgyroscope is generated at the microgyroscope of the present invention while the pair of first and second weighted elements 261 and 262 are driven in the direction of the circumference, Coriolis forces having opposite direction are applied to the pair of the inner weighted elements 261 and 262 in the direction of the Y-axis, respectively, so that the inner weighted elements 261 and 262 are vibrated in the tuning fork mode. The vibration of the inner weighted elements 261 and 262 is detected by the sensing electrode unit 270. When the inner weighted elements 261 and 262 are vibrated, the gap varies between the fingers of the inner weighted elements vibrated in the tuning fork mode and the sensing electrode fingers of the sensing electrode unit. The microgyroscope of the present invention detects a capacitance corresponding to the varying gap to measure the size of the external force or the self-vibration.

Figure 9:
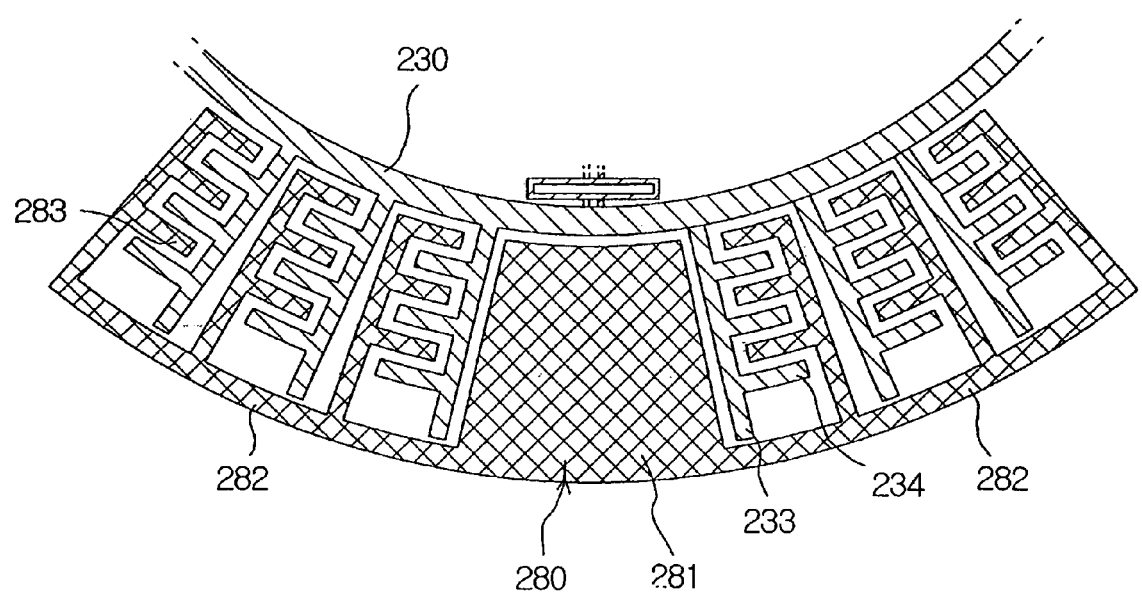
FIG. 9 is an enlarged view illustrating a feedback sensing electrode unit of the horizontal and tuning fork vibratory microgyroscope according to a second preferred embodiment of the present invention of FIG. 10.

FIG. 9 is an enlarged view illustrating the feedback sensing electrode unit of FIG. 10. As shown in FIGS. 9 and 10, the outer frame 230 has feedback electrodes formed at the outside thereof. Each of the feedback electrodes includes: a feedback electrode beam 233 radially extended from the outer circumference of the outer frame 230 so that the feedback electrode beam 233 has a predetermined length in the direction substantially perpendicular to the outer frame; and feedback electrode fingers 234 of a comb structure arranged in the longitudinal direction of the feedback electrode beam 233.

The microgyroscope of the present invention as described above may comprise a feedback electrode unit 280 for detecting a capacitance on the basis of the gap between the feedback electrode unit 280 and the feedback electrode fingers 234 of the outer frame 230. The feedback electrode unit 280 includes: a feedback electrode pad 281 fixed to the substrate 205; a feedback electrode beam 282 extended from the feedback electrode pad 281 while the feedback electrode beam 282 is spaced apart from the feedback electrode beams 233 of the outer frame 230, the feedback electrode beam 282 having a predetermined length; and feedback electrode fingers 283 of a comb structure extended from the feedback electrode beam 282, the feedback electrode fingers 283 meshing with the feedback electrode fingers 234 of the outer frame 230 while the feedback electrode fingers 283 are spaced apart from the feedback electrode fingers 234 by a predetermined gap, respectively.

The microgyroscope according to the second preferred embodiment of the present invention decreases the resonant frequency of the second mode in the vibrating mode so that the first and second modes are switched, thus switching the driving mode. In other words, the microgyroscope according to the second preferred embodiment of the present invention uses the mode in the rotating direction as a driving mode having a relatively large displacement. Consequently, the combs are arranged in the direction of the circumference of the microgyroscope so that the microgyroscope is driven in the rotating direction, and the sensing electrodes are also arranged in the direction of the circumference of the microgyroscope to induce the self-oscillation. The inner weighted element unit and the outer frame of the microgyroscope according to the second preferred embodiment of the present invention are connected to each other by means of the elastic element unit formed in the shape of "n" as in the first preferred embodiment of the present invention, except that the microgyroscope according to the second preferred embodiment of the present invention does not includes the bent connection part because the displacement at the sensing part is relatively small. The inner weighted elements of the microgyroscope according to the second preferred embodiment of the present invention are moved while the inner weighted elements are opposite to each other, a change of capacitance which is proportional to the angular velocity and modulated by the oscillation frequency is induced at the sensing electrodes, which is detected to measure the angular velocity, as in the first preferred embodiment of the present invention. The microgyroscope of the present invention has a basic structure in which it is moved in the symmetrical sensing mode to offset the effect caused by external vibration.

As apparent from the above description, the present invention provides a horizontal and tuning fork vibratory microgyroscope in which driving and sensing directions are horizontal directions so that dynamic characteristics of an elastic element unit and a weighted element unit determining frequency in a driving mode and a sensing mode are determined only by a single process, and a change of line width is given in the same direction, whereby the characteristics are highly improved irrespective of changes to the process. Regardless of whether the line width is decreased or increased in the process, the driving and sensing modes are identically carried out. The dynamic characteristics, such as the strength of the elastic element unit and the size of the weighted element unit, are identically decreased or increased depending upon whether the line width is decreased or increased in the process. At this time, no change of the characteristics on the basis of a change in thickness of the structure occurs in the process since the resonant frequency is not a function of the thickness of the structure.

Furthermore, the microgyroscope of the present invention uses a tuning fork mode in both driving and sensing modes, whereby any effect caused by the external vibration or noise is minimized. The movement of two weighted elements facing each other is used as the tuning fork mode, whereby the microgyroscope of the present invention is unaffected by external vibration, and thus a displacement is electrically offset by the sensing electrodes even when the displacement is caused by external vibration.

According to the present invention, each of the inner elastic elements is formed in the shape of "n", by which coupling between the two weighted elements is guaranteed, whereby the weighted elements are moved in the stable tuning fork mode. Consequently, the weighted elements are moved in the stable tuning fork mode by coupling the inner weighted elements with each other, and nodal points are dynamically supported, whereby tuning fork mode is not affected by the external vibration.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A horizontal and tuning fork vibratory microgyroscope comprising:

a substrate having a plane structure in the horizontal direction defined by a X-axis and a Y-axis substantially perpendicular to the X-axis;

an anchored pad unit including a plurality of anchored pads anchored to the substrate;

an outer elastic element unit including a plurality of outer elastic elements connected at one end thereof to the anchored pads of the anchored pad unit, respectively;

an outer frame made substantially in the shape of a circle and connected to the other end of each of the plurality of outer elastic elements of the outer elastic element unit while the outer frame is spaced apart from the substrate by a predetermined gap, the outer frame including a driven electrode having driven electrode fingers forming a comb structure formed at the outside of the outer frame;

a driven electrode unit having driven electrode fingers forming a comb structure, the driven electrode fingers meshing with the driven electrode fingers of the outer frame while the driven electrode fingers are spaced apart from the driven electrode fingers by a predetermined gap, respectively;

an inner elastic element unit including a plurality of inner elastic elements connected at one end thereof to the inside of the outer frame;

an inner weighted element unit including a pair of first and second inner weighted elements having vibrating electrode fingers forming comb structures, respectively, the first and second inner weighted elements being connected to the other end of the plurality of inner elastic elements of the inner elastic element unit, respectively; and a sensing electrode unit including first and second sensing electrodes having sensing electrode fingers forming comb structures, respectively, the sensing electrode fingers meshing with the vibrating electrode fingers of the first and second inner weighted elements of the inner weighted element unit while the sensing electrode fingers are spaced apart from the vibrating electrode fingers by a predetermined gap, respectively.

2. The gyroscope as set forth in claim 1,
wherein the outer elastic element unit includes first to third outer elastic elements connected to the anchored pads of the anchored pad unit, respectively, for uniformly and elastically supporting the outer frame, and
wherein the first to third outer elastic elements have the same structure.

3. The gyroscope as set forth in claim 1, wherein the driven electrode of the outer frame includes:
driven electrode beams formed at the outside of the outer frame so that each of the driven electrode beams has a predetermined length in the direction perpendicular to the outer frame; and
electrode fingers forming a comb structure arranged along the longitudinal direction of each of the driven electrode beams.

4. The gyroscope as set forth in claim 3, wherein the inner elastic element unit includes:
first and second inner elastic elements inwardly extended from the inner circumference of the outer frame while the first and second inner elastic elements are opposite to each other in the direction of the Y-axis; and
third and fourth inner elastic elements inwardly extended from the inner circumference of the outer frame while the first and second inner elastic elements are opposite to each other in the direction of the X-axis.

5. The gyroscope as set forth in claim 4, wherein each of the third and fourth inner elastic elements includes:
a body part formed on the inner circumference of the outer frame so that the body part of the third inner elastic element is opposite to the body of the fourth inner elastic element in the direction of the X-axis; and
a pair of arm parts extended from the body part so that each of the arm parts has a predetermined length in the direction of the X-axis, the arm parts being connected to the pair of inner weighted elements, respectively.

6. The gyroscope as set forth in claim 5, wherein the pair of arm parts of each of the third and fourth inner elastic elements are formed with the same width.

7. The gyroscope as set forth in claim 5, wherein each of the third and fourth inner elastic elements is formed in the shape of "π" obtained by combination of the body part and the pair of arm parts.

8. The gyroscope as set forth in claim 3,
wherein the first and second inner elastic elements are symmetrical to each other, and
wherein each of the first and second inner elastic elements includes:
an outer connection part connected to the inside of the outer frame in the direction of the Y-axis;
an inner connection part connected to the outside of the inner weighted element unit in the direction of the Y-axis; and
an interconnection part having a predetermined length in the direction of the X-axis for interconnecting the outer connection part and the inner connection part.

9. The gyroscope as set forth in claim 8, wherein the length of the interconnection part is larger than that of the outer connection part or that of the inner connection part.

10. The gyroscope as set forth in claim 1, wherein the driven electrode unit includes:

a driven electrode pad fixed to the substrate;
a driven electrode beam having a predetermined length and extended from the driven electrode pad while the driven electrode beam is spaced apart from the driven electrode beam of the outer frame by a predetermined gap; and
driven electrode fingers forming a comb structure formed at the driven electrode beam and meshing with the driven electrode fingers having the comb structure of the outer frame while the driven electrode fingers are spaced apart from the driven electrode fingers of the outer frame by a predetermined gap, respectively.

11. The gyroscope as set forth in claim 1, wherein the pair of first and second inner weighted elements of the inner weighted element unit are disposed in the outer frame while the inner weighted elements are spaced apart from each other by a predetermined gap in the direction of the Y-axis, each of the first and second inner weighted elements is formed in the shape of a semicircle, and the first and second inner weighted elements are symmetrical to each other about the X-axis.

12. The gyroscope as set forth in claim 11, wherein the first inner weighted element of the inner weighted element unit includes:
a weighted element frame disposed at one side in the outer frame in the direction of the Y-axis and having an inner space defined therein, the weighted element frame comprising a semicircular frame part formed along the inner circumference of the outer frame while the semicircular frame part is spaced apart from the inner circumference of the outer frame by a predetermined gap, and a linear frame part formed in the direction of the X-axis while the linear frame part is spaced apart from the second inner weighted element by a predetermined gap;
weighted element beams formed at the weighted element frame and each having a predetermined length in the inner space of the weighted element frame; and
weighted element fingers forming comb structures arranged in the longitudinal directions of the weighted element beams, respectively, and each having a predetermined length in the direction parallel to the semicircular frame part of the weighted element frame.

13. The gyroscope as set forth in claim 12, wherein the second inner weighted element of the inner weighted element unit includes:
a weighted element frame disposed at the other side in the outer frame in the direction of the Y-axis and having a inner space defined therein, the weighted element frame comprising a semicircular frame part formed along the inner circumference of the outer frame while the semicircular frame part is spaced apart from the inner circumference of the outer frame by a predetermined gap, and a linear frame part formed in the direction of the X-axis while the linear frame part is spaced apart from the linear frame part of the first inner weighted element by a predetermined gap;
weighted element beams formed at the weighted element frame and each having a predetermined length in the inner space of the weighted element frame; and
weighted element fingers forming comb structures arranged in the longitudinal directions of the weighted element beams, respectively, and each having a predetermined length in the direction parallel to the semicircular frame part of the weighted element frame.

14. The gyroscope as set forth in claim 12, wherein the pair of inner weighted elements are formed with substantially the same structure.

15. The gyroscope as set forth in claim 1, wherein the first sensing electrode of the sensing electrode unit includes:
- a sensing electrode pad disposed in the inner space of the first inner weighted element and fixed to the substrate;
- sensing electrode beams extended from the sensing electrode pad and disposed between the weighted element beams of the first weighted element so that the sensing electrode beams and the weighted element beams are alternately arranged; and
- sensing electrode fingers formed at the sensing electrode beam, the sensing electrode fingers being radially arranged and meshing with the weighted element fingers of the first weighted element while the sensing electrode fingers are spaced apart from the weighted element fingers, respectively.

16. The gyroscope as set forth in claim 1, wherein the second sensing electrode of the sensing electrode unit includes:
- a sensing electrode pad disposed in the inner space of the second inner weighted element and fixed to the substrate;
- sensing electrode beams extended from the sensing electrode pad and disposed between the weighted element beams of the first weighted element so that the sensing electrode beams and the weighted element beams are alternately arranged; and
- sensing electrode fingers formed at the sensing electrode beam, the sensing electrode fingers being radially arranged and meshing with the weighted element fingers of the first weighted element while the sensing electrode fingers are spaced apart from the weighted element fingers, respectively.

17. The gyroscope as set forth in claim 1,
wherein the outer frame has feedback electrodes formed at the outside thereof, and
wherein each of the feedback electrodes includes:
- a feedback electrode beam radially extended from the outer circumference of the outer frame so that the feedback electrode beam has a predetermined length in the direction substantially perpendicular to the outer frame; and
- feedback electrode fingers forming a comb structure arranged in the longitudinal direction of the feedback electrode beam.

18. The gyroscope as set forth in claim 17, further comprising:
- a feedback electrode unit for detecting a capacitance on the basis of the gap between the feedback electrode unit and the feedback electrode fingers of the outer frame.

19. The gyroscope as set forth in claim 18, wherein the feedback electrode unit includes:
- a feedback electrode pad fixed to the substrate;
- a feedback electrode beam extended from the feedback electrode pad while the feedback electrode beam is spaced apart from the feedback electrode beams of the outer frame, the feedback electrode beam having a predetermined length; and
- feedback electrode fingers forming a comb structure extended from the feedback electrode beam, the feedback electrode fingers meshing with the feedback electrode fingers of the outer frame while the feedback electrode fingers are spaced apart from the feedback electrode fingers by a predetermined gap, respectively.

* * * * *